(12) United States Patent
Tanaka et al.

(10) Patent No.: US 7,414,746 B2
(45) Date of Patent: Aug. 19, 2008

(54) IMAGE DATA COMMUNICATION METHOD

(75) Inventors: Hiroshi Tanaka, Asaka (JP); Hisayoshi Tsubaki, Asaka (JP); Mikio Watanabe, Asaka (JP); Yukihiro Kawada, Asaka (JP)

(73) Assignee: Fujifilm Corporation, Tokyo (JP)

( * ) Notice: Subject to any disclaimer, the term of this patent is extended or adjusted under 35 U.S.C. 154(b) by 659 days.

(21) Appl. No.: 09/861,722

(22) Filed: May 22, 2001

(65) Prior Publication Data

US 2001/0048534 A1 Dec. 6, 2001

(30) Foreign Application Priority Data

May 23, 2000 (JP) ............................. 2000-151792
Jul. 19, 2000 (JP) ............................. 2000-218336

(51) Int. Cl.
*G06F 15/00* (2006.01)
*H04N 5/225* (2006.01)

(52) U.S. Cl. ..................... 358/1.15; 358/1.14; 358/403; 358/434; 348/207.2

(58) Field of Classification Search ................ 358/1.15, 358/1.14, 403, 434; 715/526; 713/155; 348/207.2
See application file for complete search history.

(56) References Cited

U.S. PATENT DOCUMENTS

| 5,481,367 | A | * | 1/1996 | Yokoe et al. ................. 358/296 |
| 5,719,987 | A | * | 2/1998 | Kawamura et al. ........... 386/120 |
| 5,899,581 | A | * | 5/1999 | Kawamura et al. ........... 386/120 |
| 6,154,755 | A | * | 11/2000 | Dellert et al. ................ 715/526 |
| 6,184,996 | B1 | * | 2/2001 | Gase ........................... 358/1.15 |
| 6,192,191 | B1 | * | 2/2001 | Suga et al. ................... 386/120 |
| 6,335,746 | B1 | * | 1/2002 | Enokida et al. .............. 345/839 |
| 6,378,070 | B1 | * | 4/2002 | Chan et al. ................... 713/155 |
| 6,504,960 | B2 | * | 1/2003 | Takahashi .................... 382/305 |
| 6,535,243 | B1 | * | 3/2003 | Tullis ....................... 348/207.1 |
| 6,587,911 | B1 | * | 7/2003 | Kawamura et al. .......... 710/315 |
| 6,687,453 | B1 | * | 2/2004 | Sakamoto et al. ............. 386/46 |
| 6,722,800 | B2 | * | 4/2004 | Kimura ........................ 400/76 |
| 6,784,925 | B1 | * | 8/2004 | Tomat et al. ............ 348/207.11 |
| 6,785,023 | B1 | * | 8/2004 | Iida ............................. 358/442 |
| 6,812,962 | B1 | * | 11/2004 | Fredlund et al. .......... 348/231.2 |

(Continued)

FOREIGN PATENT DOCUMENTS

JP 4-260945 A 9/1992

(Continued)

*Primary Examiner*—Edward L. Coles, Sr.
*Assistant Examiner*—Chan S. Park
(74) *Attorney, Agent, or Firm*—Birch, Stewart, Kolasch & Birch, LLP

(57) ABSTRACT

A data transmitting device transmits a print file showing file names of image files and print conditions to a data receiving device, and the data receiving device stores the received print file in a storage medium. Then, the data receiving device requests one of the image files from the data transmitting according to the file names shown in the print file, and the data transmitting device transmits the one of the image files to the data receiving device in response to the request. The data receiving device stores the one of the image files in a storage medium and prints the image in the print condition shown in the print file, and the data receiving device and the data transmitting device repeat the steps for each of the image files.

10 Claims, 26 Drawing Sheets

U.S. PATENT DOCUMENTS

| | | | |
|---|---|---|---|
| 6,834,130 B1 * | 12/2004 | Niikawa et al. | 382/305 |
| 7,106,461 B2 * | 9/2006 | Kakigi et al. | 358/1.12 |

FOREIGN PATENT DOCUMENTS

| | | |
|---|---|---|
| JP | 6-8537 A | 1/1994 |
| JP | 6-233225 A | 8/1994 |
| JP | 9-135412 A | 5/1997 |
| JP | 10-74154 A | 3/1998 |
| JP | 10-145730 A | 5/1998 |
| JP | 10215397 A | 8/1998 |
| JP | 10308981 A | 11/1998 |
| JP | 10341327 A | 12/1998 |
| JP | 11-7701 A | 1/1999 |
| JP | 11-127323 A | 5/1999 |
| JP | 11-161808 A | 6/1999 |
| JP | 11150673 | 6/1999 |
| JP | 2000-90095 A | 3/2000 |
| JP | 2000-122835 A | 4/2000 |
| JP | 2000-125233 A | 4/2000 |

* cited by examiner

F I G. 4

SET

DATE/TIME:99/12/14 12:00:00

RECORDING MODE:FINE  NORMAL  ECONOMY

PIXELS:VGA(640 × 480)  XGA(1024 × 768)

AUTO-POWER-SAVE:2min

SOUND:LARGE  SMALL  NONE

F I G. 7
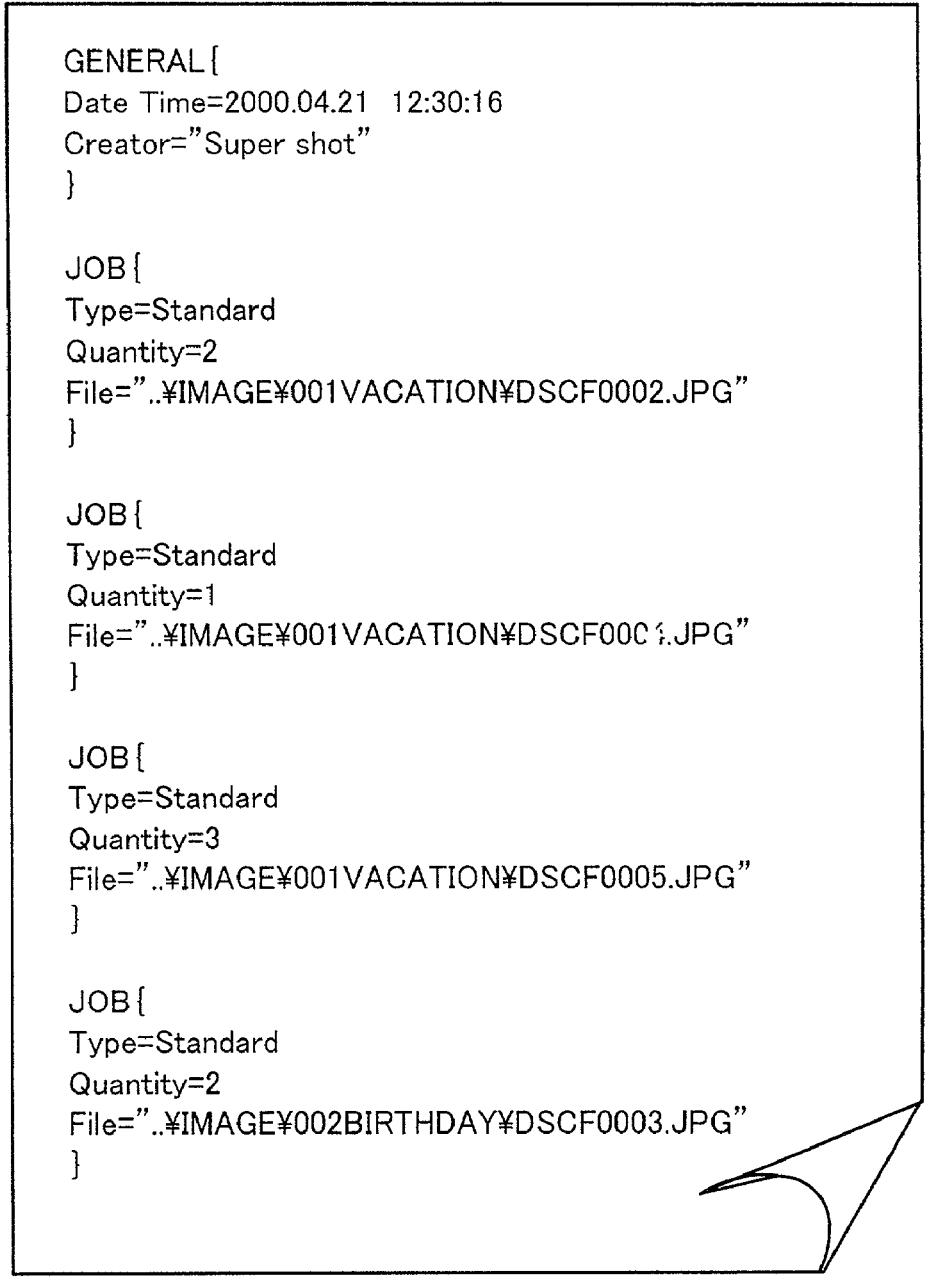
```
GENERAL{
Date Time=2000.04.21  12:30:16
Creator="Super shot"
}
JOB{
Type=Standard
Quantity=2
File="..¥IMAGE¥001VACATION¥DSCF0002.JPG"
}
JOB{
Type=Standard
Quantity=1
File="..¥IMAGE¥001VACATION¥DSCF0001.JPG"
}
JOB{
Type=Standard
Quantity=3
File="..¥IMAGE¥001VACATION¥DSCF0005.JPG"
}
JOB{
Type=Standard
Quantity=2
File="..¥IMAGE¥002BIRTHDAY¥DSCF0003.JPG"
}
```

F I G. 1 2
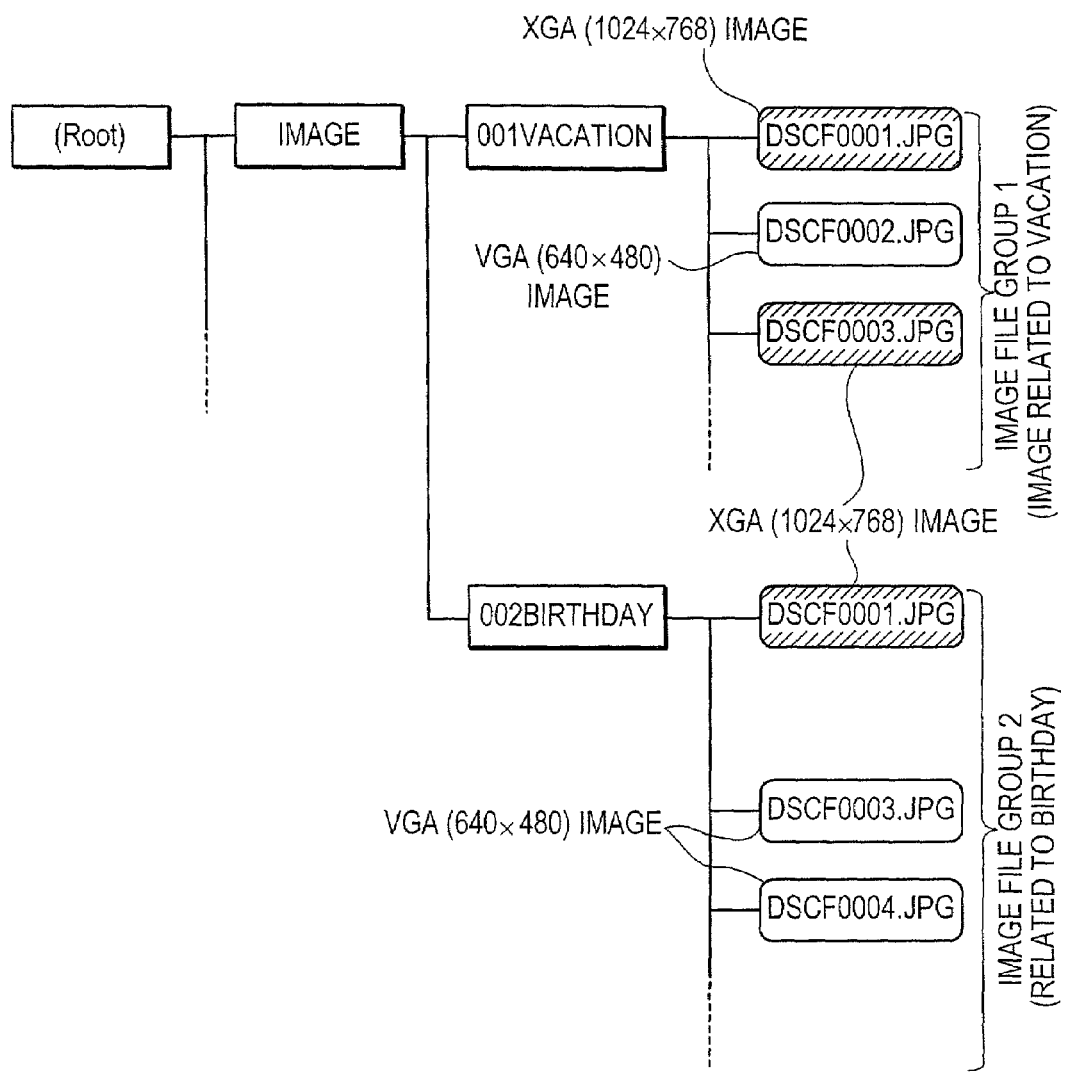

FIG. 13
TAG INFORMATION (PROPERTIES)
RECORDED:DECEMBER 14TH 1999,12:31:10
RECORDING MODE:NORMAL
TITLE:"VACATION"
WHITE BALANCE:AUTO
FOCUS:MANUAL
LOCATION:UNKNOWN
FLASH:OFF
⋮
...
THUMBNAIL DATA (160X120) 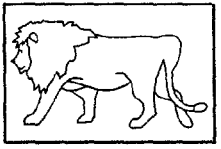
MAIN IMAGE DATA(1024X768 OR 640X480)
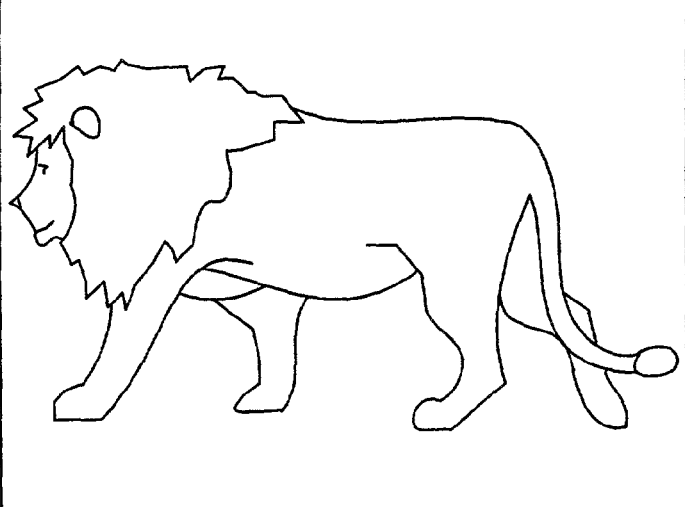

FIG. 14

```
100
[0001]
      path=¥IMAGE¥001VACATION¥DSCF0001.JPG
      width=1024
      heigth=768
      mode=economy
      data=2000:06:01
      time=10:20:30

[0002]
      path=¥IMAGE¥001VACATION¥DSCF0002.JPG
      width=640
      heigth=480
      mode= normal
      data=2000:06:01
      time=10:21:00

[0003]
      path=¥IMAGE¥001VACATION¥DSCF0003.JPG
      width=1024
      heigth=768
      mode=fine
      data=2000:06:01
      time=10:22:00
      ...
[00011]
      path=¥IMAGE¥002BIRTHDAY¥DSCF0001.JPG
      width=1024
      heigth=768
      mode=fine
      data=2000:06:09
      time=19:21:20

[00012]
      path=¥IMAGE¥002BIRTHDAY¥DSCF0003.JPG
      width=640
      heigth=480
      mode=normal
      data=2000:06:09
      time=19:23:20

[00013]
      path=¥IMAGE¥002BIRTHDAY¥DSCF0004.JPG
      width=640
      heigth=480
      mode=economy
      data=2000:06:09
      time=19:25:15

...
```

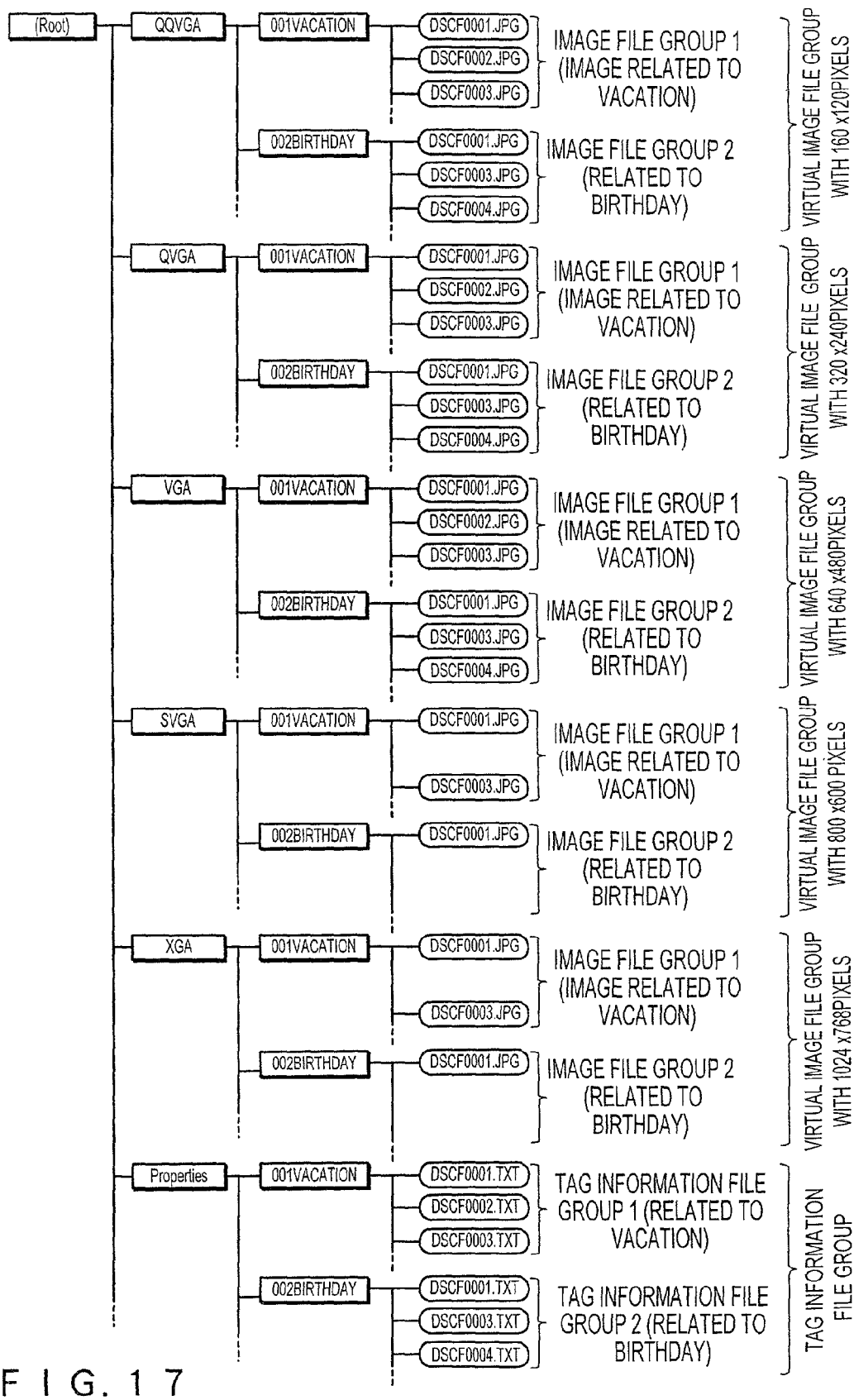
F I G. 17

FIG. 18

¥QQVGA¥001VACATION¥DSCF0001.JPG
¥QQVGA¥001VACATION¥DSCF0002.JPG
¥QQVGA¥001VACATION¥DSCF0003.JPG
¥QQVGA¥002BIRTHDAY¥DSCF0001.JPG
¥QQVGA¥002BIRTHDAY¥DSCF0003.JPG
¥QQVGA¥002BIRTHDAY¥DSCF0004.JPG

¥QVGA¥001VACATION¥DSCF0001.JPG
¥QVGA¥001VACATION¥DSCF0002.JPG
¥QVGA¥001VACATION¥DSCF0003.JPG
¥QVGA¥002BIRTHDAY¥DSCF0001.JPG
¥QVGA¥002BIRTHDAY¥DSCF0003.JPG
¥QVGA¥002BIRTHDAY¥DSCF0004.JPG

¥VGA¥001VACATION¥DSCF0001.JPG
¥VGA¥001VACATION¥DSCF0002.JPG
¥VGA¥001VACATION¥DSCF0003.JPG
¥VGA¥002BIRTHDAY¥DSCF0001.JPG
¥VGA¥002BIRTHDAY¥DSCF0003.JPG
¥VGA¥002BIRTHDAY¥DSCF0004.JPG

¥SVGA¥001VACATION¥DSCF0001.JPG
¥SVGA¥001VACATION¥DSCF0003.JPG
¥SVGA¥002BIRTHDAY¥DSCF0001.JPG

¥XVGA¥001VACATION¥DSCF0001.JPG
¥XVGA¥001VACATION¥DSCF0003.JPG
¥XVGA¥002BIRTHDAY¥DSCF0001.JPG

¥Properties¥001VACATION¥DSCF0001.JPG
¥Properties¥001VACATION¥DSCF0002.JPG
¥Properties¥001VACATION¥DSCF0003.JPG
¥Properties¥002BIRTHDAY¥DSCF0001.JPG
¥Properties¥002BIRTHDAY¥DSCF0003.JPG
¥Properties¥002BIRTHDAY¥DSCF0004.JPG

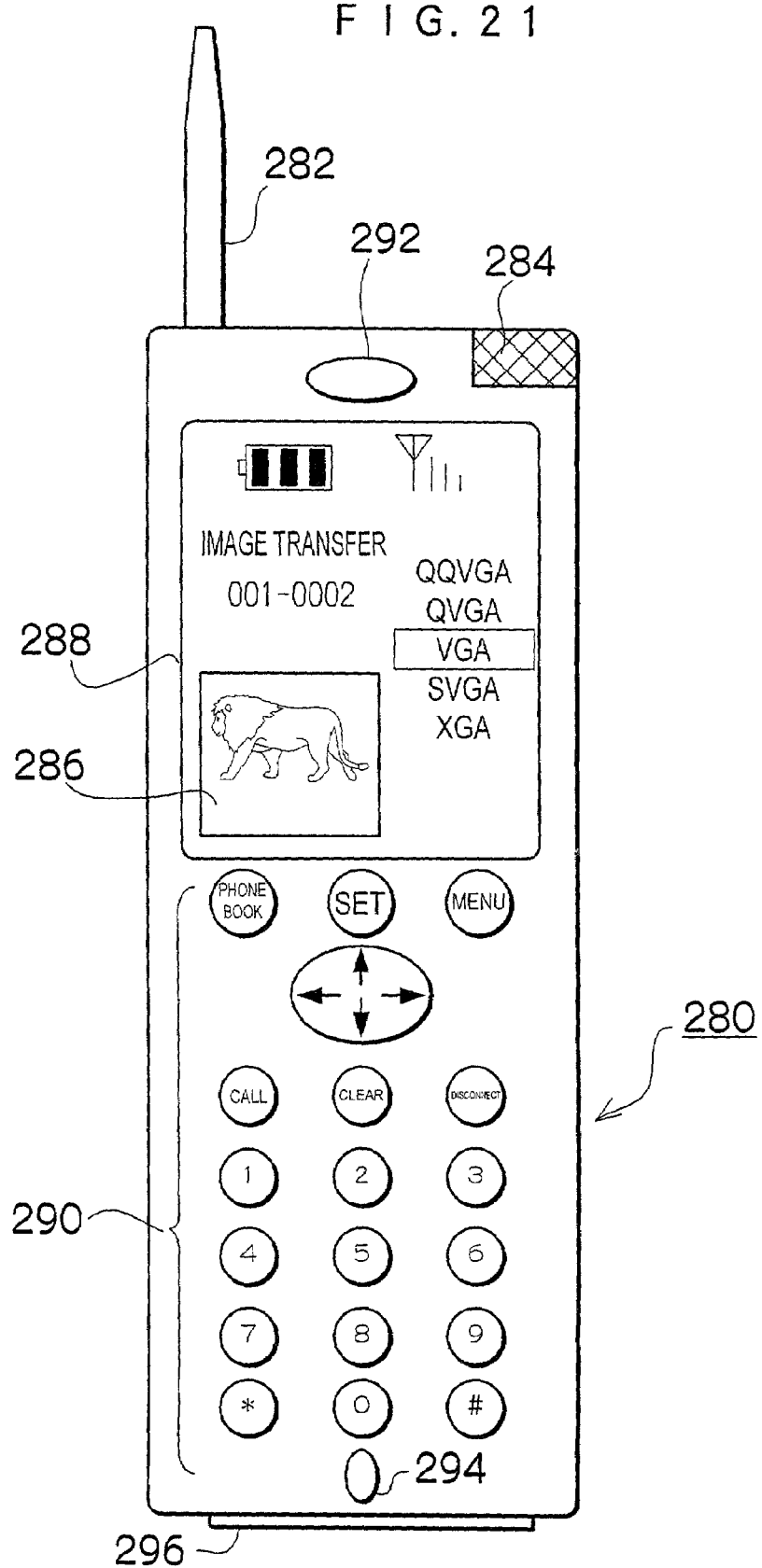

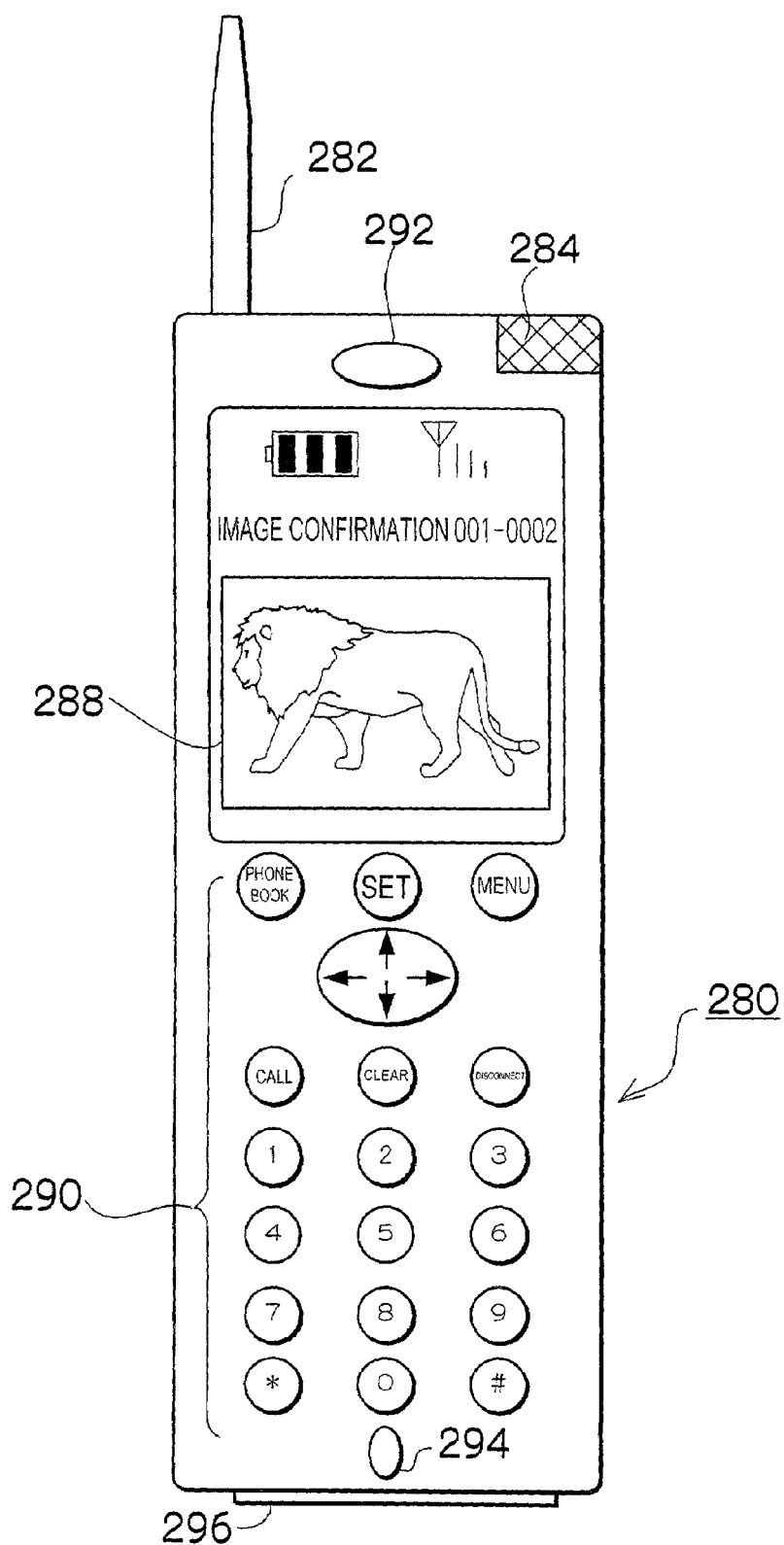

F I G. 2 3
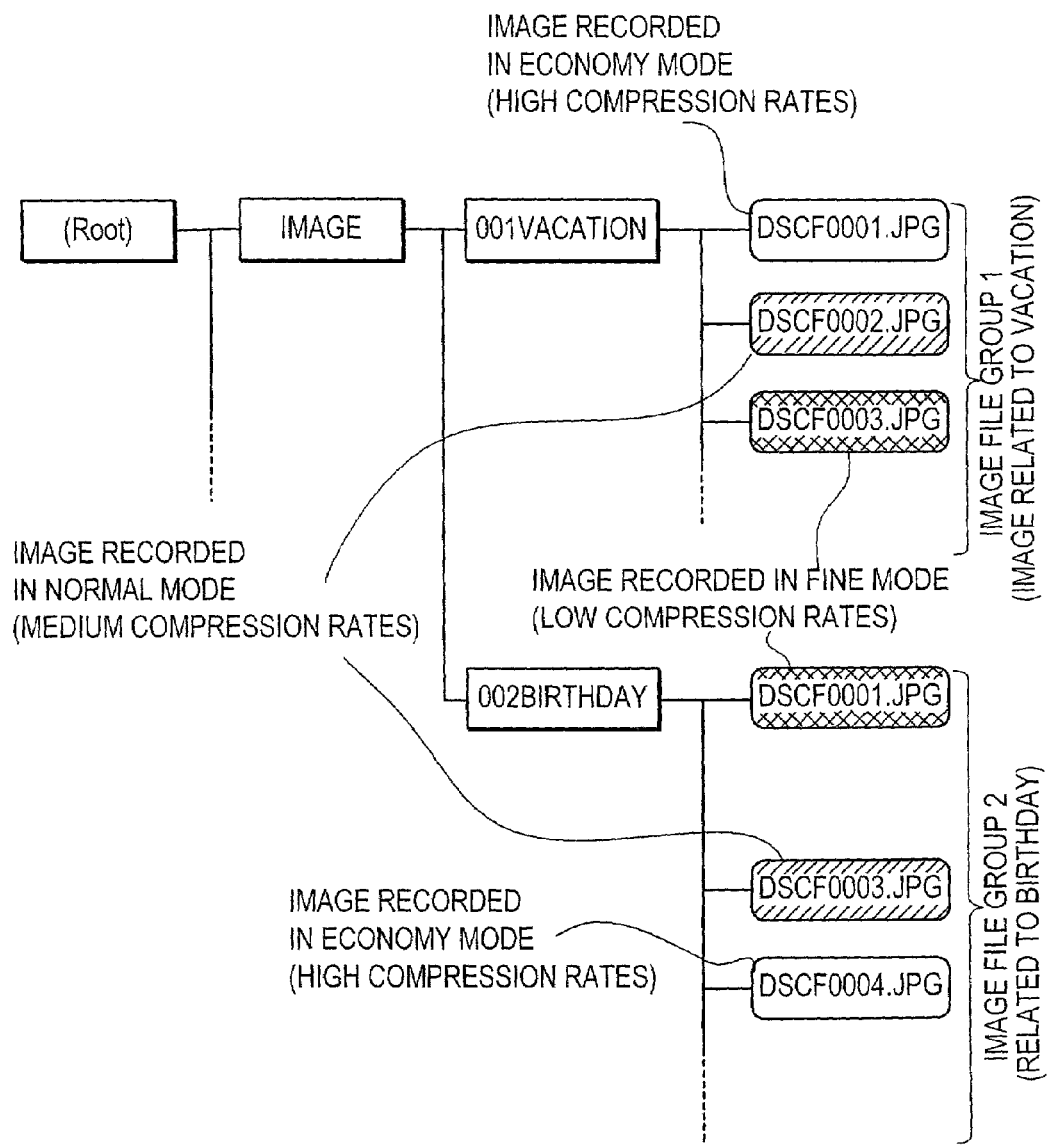

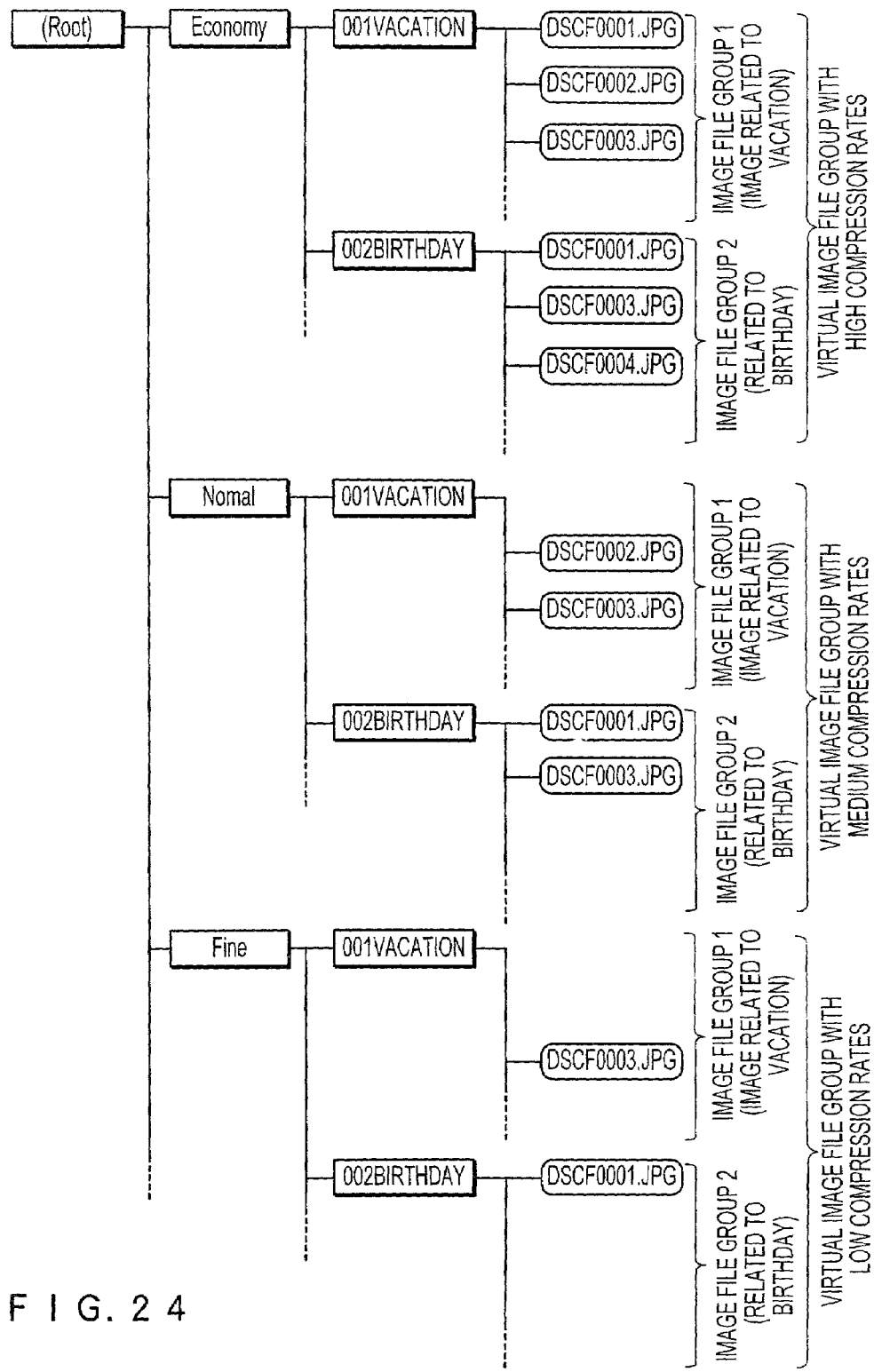
F I G. 24

IMAGE DATA COMMUNICATION METHOD

BACKGROUND OF THE INVENTION

1. Field of the Invention

The present invention relates to an image data communication method. Particularly, it relates to an image data communication method in which a data transmitting device transmits image files of image data stored in a storage medium to a data receiving device and the data receiving device prints images according to the image data The present invention also relates to an image data communication method. Particularly, it relates to an image data communication method in which a data transmitting device transmits one of the image files of image data stored in a storage medium to a data receiving device.

2. Description of the Related Art

Japanese Patent Application Laid-open No. 11-150673 discloses a digital camera that stores a print file showing the number of prints in a storage medium with image data. When the storage medium is removed from the camera and inserted into a printer, the printer automatically makes the number of prints shown in the print file. Japanese Patent Application Laid-open No. 10-341327 discloses a digital camera that communicates with a printer to transmit image data to the printer. However, in this printer, the user needs to operate both the camera and the printer, and the printer can not make the preset number of prints.

Japanese Patent Application Laid-open No. 10-215397 discloses a wireless communication method in which thumbnails are displayed on a data receiving device and the user selects an image according to the thumbnails. Image data of the selected image is transmitted from a digital camera to the data receiving device. Japanese Patent Application Laid-open No. 10-308981 discloses a wireless communication method in which a wireless terminal receives an image file from a digital camera and transmits it to a base station. Image file information is displayed when the user selects the image. However, when the image file information is produced, tag information of all image files needs to be read, and it takes a long time.

SUMMARY OF THE INVENTION

The present invention has been made in view of these circumstances, with the objective of providing an image data communication method in which a data receiving device can easily receive image data from a data transmitting device and print an image.

The present invention has been also made in view of these circumstances, with the objective of providing an image data communication method in which image file information can be quickly produced.

In order to achieve the above-described object, the present invention is directed to an image data communication method in which a data transmitting device transmits image files of image data stored in a storage medium to a data receiving device and the data receiving device prints images according to the image data, wherein: (a) the data transmitting device transmits a print file showing file names of the image files and print conditions to the data receiving device; (b) the data receiving device stores the received print file in a storage medium; (c) the data receiving device requests one of the image files from the data transmitting device according to the file names shown in the print file; (d) the data transmitting device transmits the one of the image files to the data receiving device in response to the request; (e) the data receiving device stores the one of the image files in a storage medium and prints the image in the print condition shown in the print file; and (f) the data receiving device and the data transmitting device repeat steps (c), (d) and (e) for each of the image files.

According to the present invention, the data receiving device can easily receive image data from the data transmitting device and print the image.

In order to achieve the above described object, the present invention is also directed to an image data communication method in which a data transmitting device transmits one of image files of image data stored in a storage medium to a data receiving device, wherein: the data transmitting device produces an image file list showing properties of the image files and stores the image file list in a storage medium; when a user requests image file information from the data transmitting device by operating the data receiving device, the data transmitting device produces the requested image file information according to the image file list and transmits it to the data receiving device; the data receiving device displays the received image file information; the user selects the image file according to the displayed image file information by operating the data receiving device, and the data receiving device requests the selected image file from the data transmitting device; the data transmitting device transmits the requested image file to the data receiving device; and the data receiving device stores the received image file in a storage medium.

According to the present invention, the image file information can be quickly produced even if many image files are stored.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 4 shows a display when the electronic camera is in a set mode;

FIG. 7 shows a print file;

FIG. 12 shows a structure of directories including image files stored in the storage medium of the electronic camera;

FIG. 13 shows a structure of an image file;

FIG. 14 shows an image file list;

FIG. 17 shows the structure of virtual directories and files categorized according to resolutions;

FIG. 18 shows a description of the virtual directories and files shown in FIG. 17;

FIG. 21 shows a display of the cellular phone in an image transfer menu;

FIG. 22 shows an example of display of the cellular phone in an image confirmation mode;

FIG. 23 shows another structure of the directories including the image files stored in the storage medium of the electronic camera;

FIG. 24 shows the structure of the virtual directories and files categorized according to recording modes.

DETAILED DESCRIPTION OF THE PREFERRED EMBODIMENTS

A preferred embodiment of the present invention will be described below according to the attached drawings.

Figure 1:
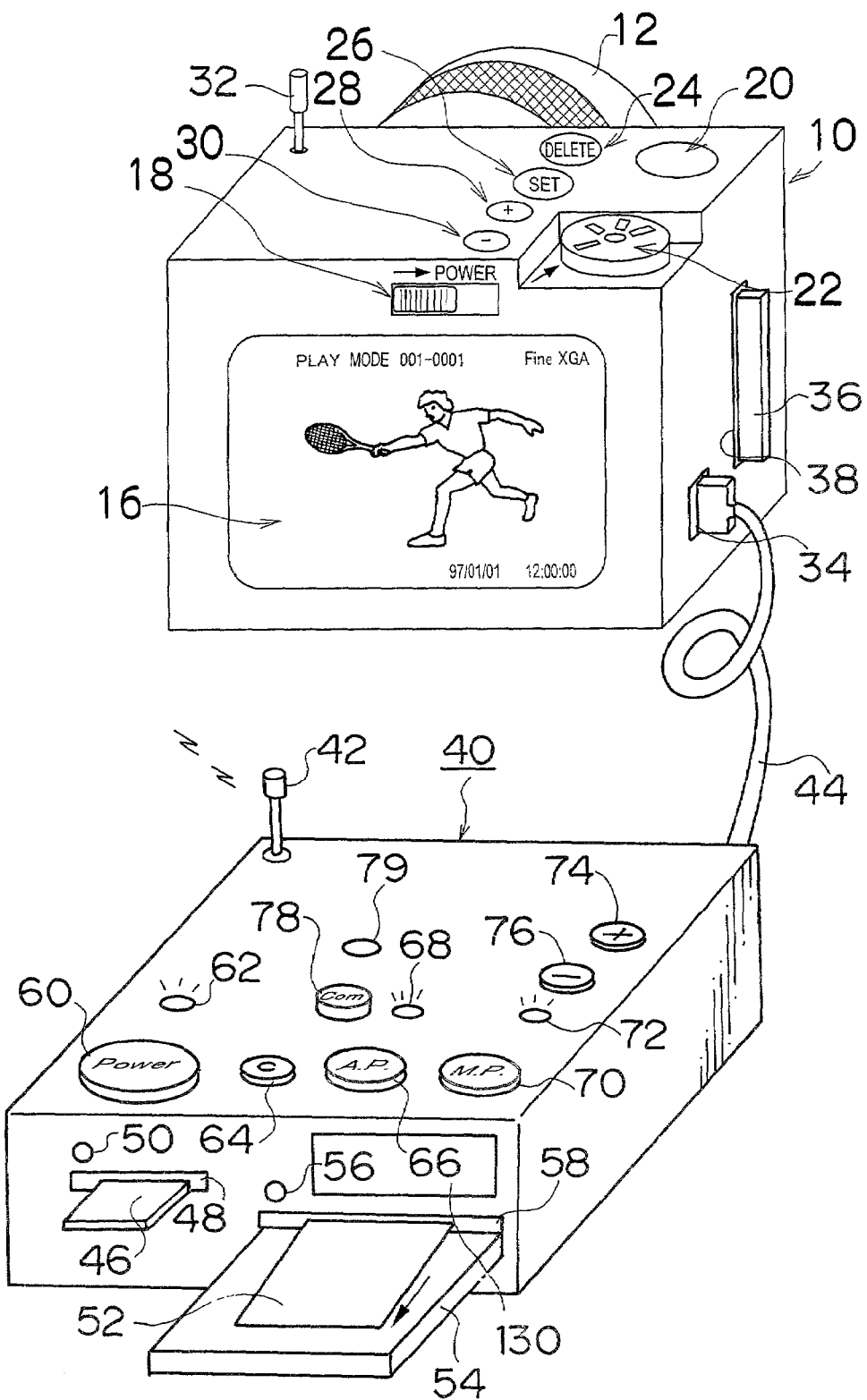
FIG. 1 is an external perspective view of an electronic camera and a printer.

FIG. 1 is an external perspective view of an electronic camera 10 (an information transmitting device) and a printer 40 (an information receiving device) that is connected to the electronic camera 10.

The electronic camera 10 comprises a taking lens 12; a display (LCD) 16 that displays an image, a frame number, etc.; a power switch 18 for turning on and off the camera 10; a shutter release button 20 for performing a shooting; a mode selector 22 for selecting one of various modes; a delete button 24 for deleting an item displayed on the display 16; a set button 26 for setting an item displayed on the display 16; an increment button 28 for increasing the frame number or the like displayed on the display 16, and a decrement button 30 for decreasing the frame number or the like displayed on the display 16.

The electronic camera 10 also has an antenna 32 for wireless communication, a communication connector 34 for wire communication, and a storage medium slot 38 in which a removable storage medium 36 is inserted.

Figure 2:
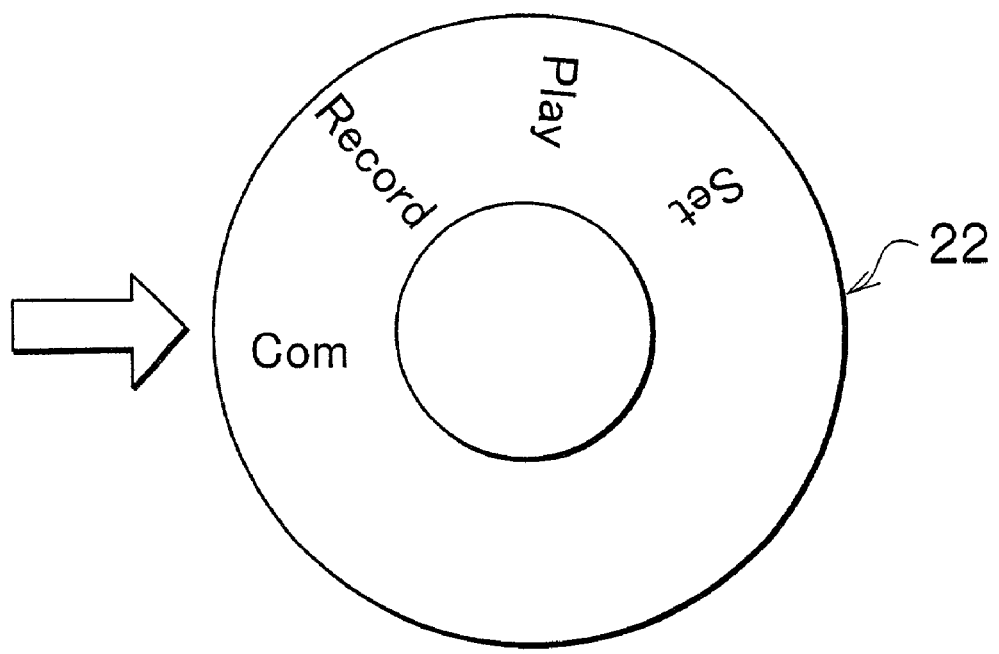
FIG. 2 shows a mode selector of the electronic camera.

FIG. 2 shows the mode selector 22.

The camera 10 has a communication mode (Com) for communicating with other communication device such as the printer 40, a record mode (Record) for performing a shooting, a play mode (Play) for reproducing a recorded image, and a set mode (Set) for setting the date, a recording mode, the number of pixels, an auto-power-save time and volume of sounds. The user rotates the mode selector 22 to select one of the modes.

As shown in FIG. 1, the printer 40 comprises an antenna 42 that transmits and receives data, a communication cable 44 for wire communication, and a storage medium slot 48 in which a removable storage medium 46 is inserted. A storage medium indicator 50 indicates the state of the storage medium 46.

Sheets of paper 52 are stored in a paper tray 54 attached to the printer 40. A print indicator 56 is on while the printer 40 is printing. A printed sheet of paper 52 is outputted from an output slot 58.

The printer 40 also comprises a power switch 60 for turning on and off the printer 40, a power indicator 62, a cancel button 64 for stopping printing, an automatic print button 66 for printing in a predetermined procedure, and an automatic print indicator 68 that is on when the automatic print can be performed. The printer 40 also has a manual print button 70 for printing only desired images, a manual print indicator 72 that is on when the manual print can be performed, a next button 74 for scanning images in order, and a back button 76 for scanning the images in the reverse order.

A display 130 (for example, a color liquid crystal display) displays communication information, a thumbnail of a selected image, and print information, a communication mode button 78 for selecting a communication mode, and a communication indicator 79 indicates the communication state of the printer 40.

Figure 3:
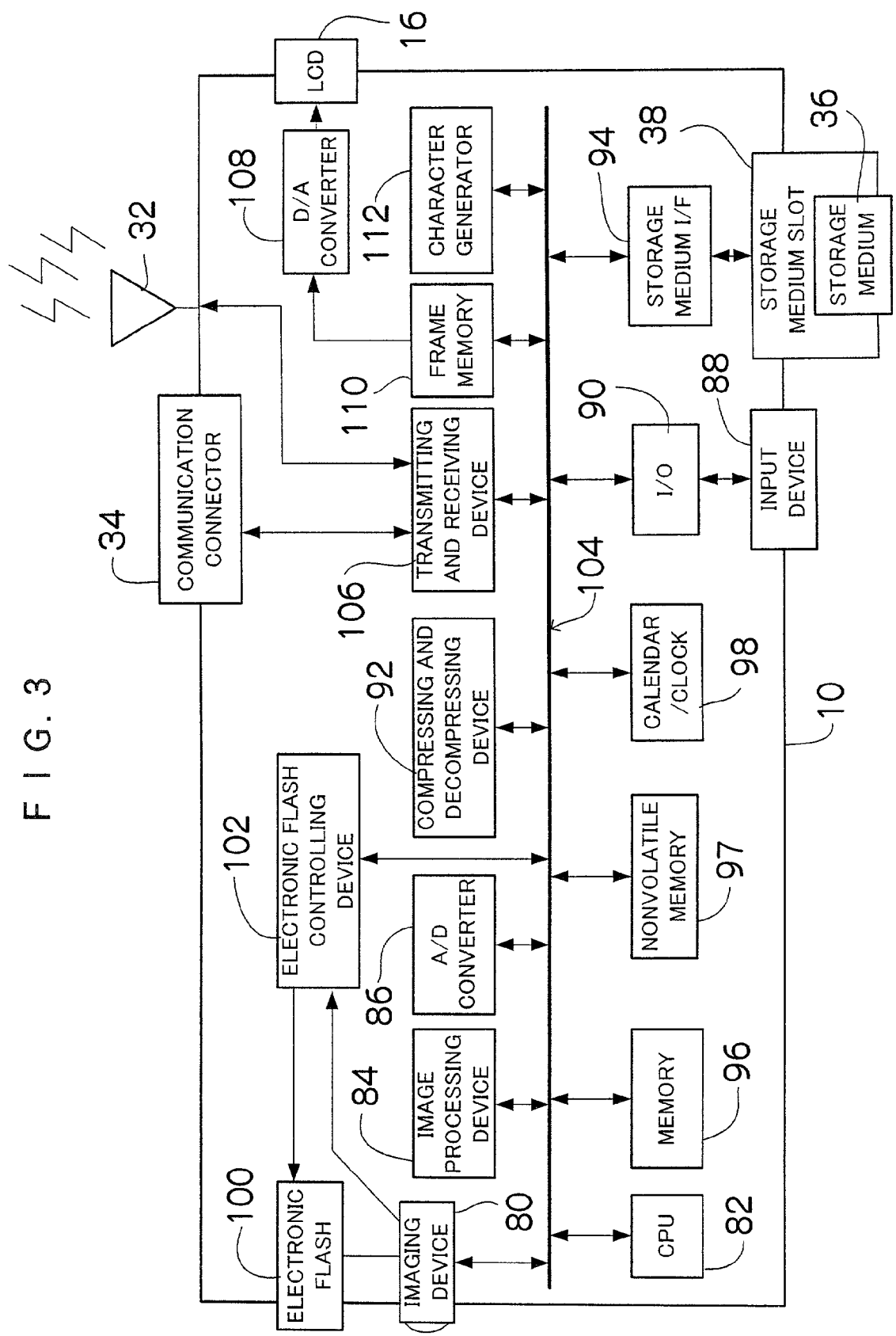
FIG. 3 is a block diagram of the electronic camera.

FIG. 3 is a block diagram of the electronic camera 10.

The electronic camera 10 is provided with an imaging device 80 which performs photoelectric conversion of the subject image formed on a receiving surface to output image data. A CPU 82 controls the entire electronic camera 10 and controls sampling timing, recording, communication, display of image data, and performs various information processings such as conversion of the number of pixels of image data, and sets and cancels a power-save mode.

An image processing device 84 that performs change of the number of pixels, sharpness correction, gamma correction, contrast correction, white balance correction, etc., and an A/D converter 86 converts analog image signals into digital image data.

An inputting device 88 includes the release button 20, the mode selector 22, the delete button 24, the set button 26, the increment button 28 and the decrement button 30, and an I/O 90 converts signals inputted by the inputting device 88.

A compressing/decompressing device 92 compresses image data and audio data in a format such as the JPEG and the MPEG, and decompresses the compressed data. A storage medium interface 56 converts storage data to store/read image data in/from the removable storage medium 36. The storage medium 36 is a memory card, an MO or the like that uses semiconductors, magnetic recording or optical recording.

A memory 96 is composed of a ROM recording operation programs and constants and a RAM in which the CPU 82 operates and image data and audio data are temporarily stored and a print file in which names of files to be printed and print conditions are recorded is stored. A nonvolatile memory 97 that records constants, the print file and so on even after the power is turned off. A calendar/clock 98 keeps the date and time, and electronic flash controlling device 102 controls an electronic flash 100.

A transmitting/receiving device 106 transmits and receives image data, audio data, a batch file, etc. in accordance with instructions from the CPU 82. An antenna 32 transmits and receives image data by wireless, and a communication connector 34 connects the camera 10 to the communication device through the cable 44 for wire communication.

A D/A converter 66 that converts digital signals into analog signals for the display 16. A frame memory (VRAM) 110 temporarily stores data to be displayed on the display 16. A character generator 68 converts code information from the CPU 82 into data of characters to be displayed on the display 16.

The above devices and memories are connected through a bus 104.

When an inquiry about the structure of directories (folders) including the image files stored in the storage medium 36 is received from the communication device such as the printer 40, the CPU 82 produces information on the directory structure.

The display 16 can display names of files to be printed recorded in the print file, and it can display paths of the image files and audio files or names of the directories and the files.

The display 16 when the electronic camera 10 is in the set mode 38 is shown in FIG. 4.

On the display 16, the user can set the date and time, and select a recording mode, and change the number of pixels, and set an auto-power-save time, and set volume of an alarm sound by operating the input device 88 of the electronic camera 10. The user can also produce and edit the print file. The print file is not necessarily produced in the set mode, and it may be produced in another mode such as the play mode.

The date and time displayed on the display 16 are kept by the calendar/clock 98, and the user can change the date and time.

Recording modes of "FINE," "NORMAL" and "ECONOMY" with different image data compression rates are displayed on the display 16. The "FINE" mode has the lowest compression rate, and the "ECONOMY" mode has the highest compression mode.

The number of pixels (resolution) of VGA (640×480) or XGA (1024×768) is also shown on the display 16.

The camera automatically enters a power-save mode (for example, a mode for reducing the processing speed of the CPU 82 and stopping power supply to elements that are not being used) when the electronic camera 10 has not been used for the auto-power-save time while the electronic camera 10 is on. To activate the electronic camera 10 from the power-save mode, the user operates any button of the inputting device 50 or sends an activating command from the communication device. The CPU 82 may set and cancel the power-save mode, and a power-save mode setting device may be provided.

The user sets the volume of sounds that are made at the activation of the electronic camera 10, at the end of the communication, during a shooting and so forth. The date and time, the recording mode and the number of pixels are displayed on the display 16 with the image at the reproduction as shown in FIG. 1.

The shooting processing of the electronic camera 10 will be described.

The subject image is formed on the receiving surface of the imaging device 80, and the subject image is photoelectrically converted into the image data, which is outputted to the image processing device 84. The image data is directed to amplification and noise reduction processing at the image processing device 84, and the image data is converted into digital data by an A/D converter 86, and the digital data is temporarily stored in the memory 96. The CPU 82 transmits the image data stored in the memory 96 to the frame memory 110, and the image data is transmitted to the D/A converter 108 at a predetermined frame rate. As need arises, the CPU 82 transmits character data stored in the memory 96 to the character generator 112, which transmits the character data to the D/A converter 108. The D/A converter 108 converts the image data and the character data into video signals, and the display 16 displays the image and characters.

When the user pushes the shutter release button 20 of the input device 88, the camera 10 enters the record mode. Then, the CPU 82 transmits the image data stored in the memory 96 to the compressing/decompressing device 52 and outputs a command to compress the image data under predetermined conditions. The CPU 82 transmits the image data to the storage medium interface 94, which stores the image data in the storage medium 36.

Also, when the user sets the communication mode 32 with the mode selector 22 and pushes a transmission button of the input device 88, the CPU 82 reads the designated image data from the storage medium 36 or the memory 96 and converts the image data in a predetermined format. Then, the converted image data is transmitted to the communication device by wireless or wire through the transmitting/receiving device 106 and the antenna 32 or the communication connector 34. The print file may be transmitted with the image data.

The electronic camera 10 may automatically determines to communicate by wire or wireless.

Figure 5:
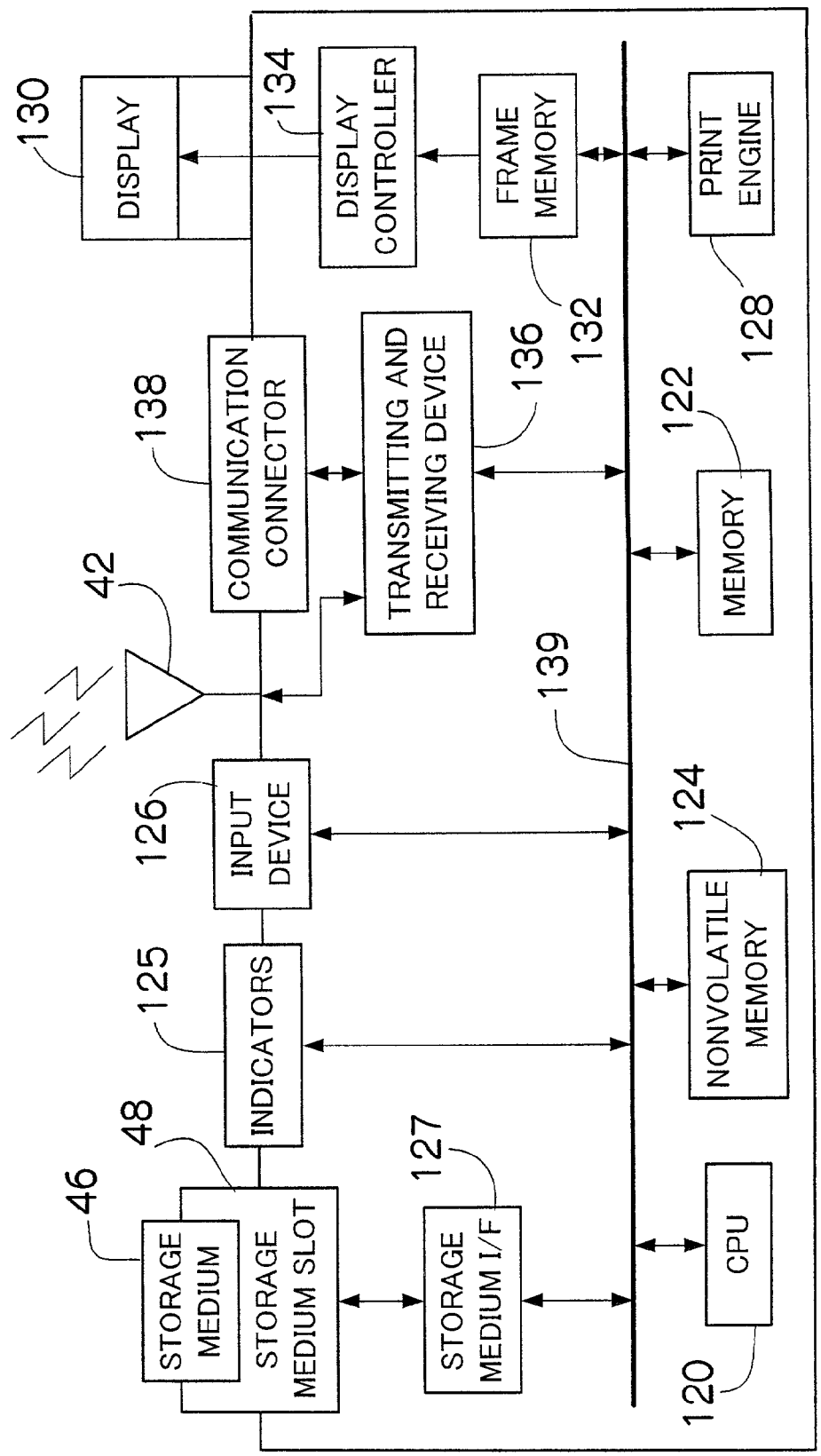
FIG. 5 is an external view of the printer.

FIG. 5 is a block diagram of the printer 40.

The printer 40 comprises a CPU 120 that controls the whole printer 40, a memory 122 composed of a ROM in which programs for the CPU 120 and constants are recorded and a RAM in which the CPU 120 operates, and a nonvolatile memory 124 that stores information even after the power is turned off. The indicators 125 are the storage medium indicator 50, the print indicator 56, the power indicator 62, the automatic print indicator 68, the manual print indicator 72, the communication indicator 79 and so on; and an input device 126 is composed of the power switch 60, the cancel button 64, the automatic print button 66, the manual print button 70, the next button 74, the back button 76, the communication mode button 78 and so on.

A storage medium interface 127 reads/writes information from/in the storage medium 46, and a print engine 128 prints the received image and characters under the conditions recorded in the print file, and a frame memory 132 temporarily stores information to be displayed on the display 130 and transmits the image data to a display controller 134 at a predetermined frame rate. The display controller 134 converts the image data into video signals, and the display 130 displays the image and the characters.

A transmitting/receiving device 136 transmits and receives the image data and the directory information in accordance with instructions of the CPU 120. The antenna 42 is used for wireless communication, and a communication connector 138 is used for wire communication.

In case of wireless communication, lights such as radio waves, ultrasonic waves and infrared lights are used. If the infrared lights are used, an IrDA format may be used.

In case of wire communication, a serial interface format such as the RS-232, RS-422, the USB and the IEEE1394 may be used, and a parallel interface format may be used.

The electronic camera 10 and the printer 40 may directly communicate, and they may communicate through communication lines such as public lines, a communication network such as the Internet, or another communication device.

Figure 6:
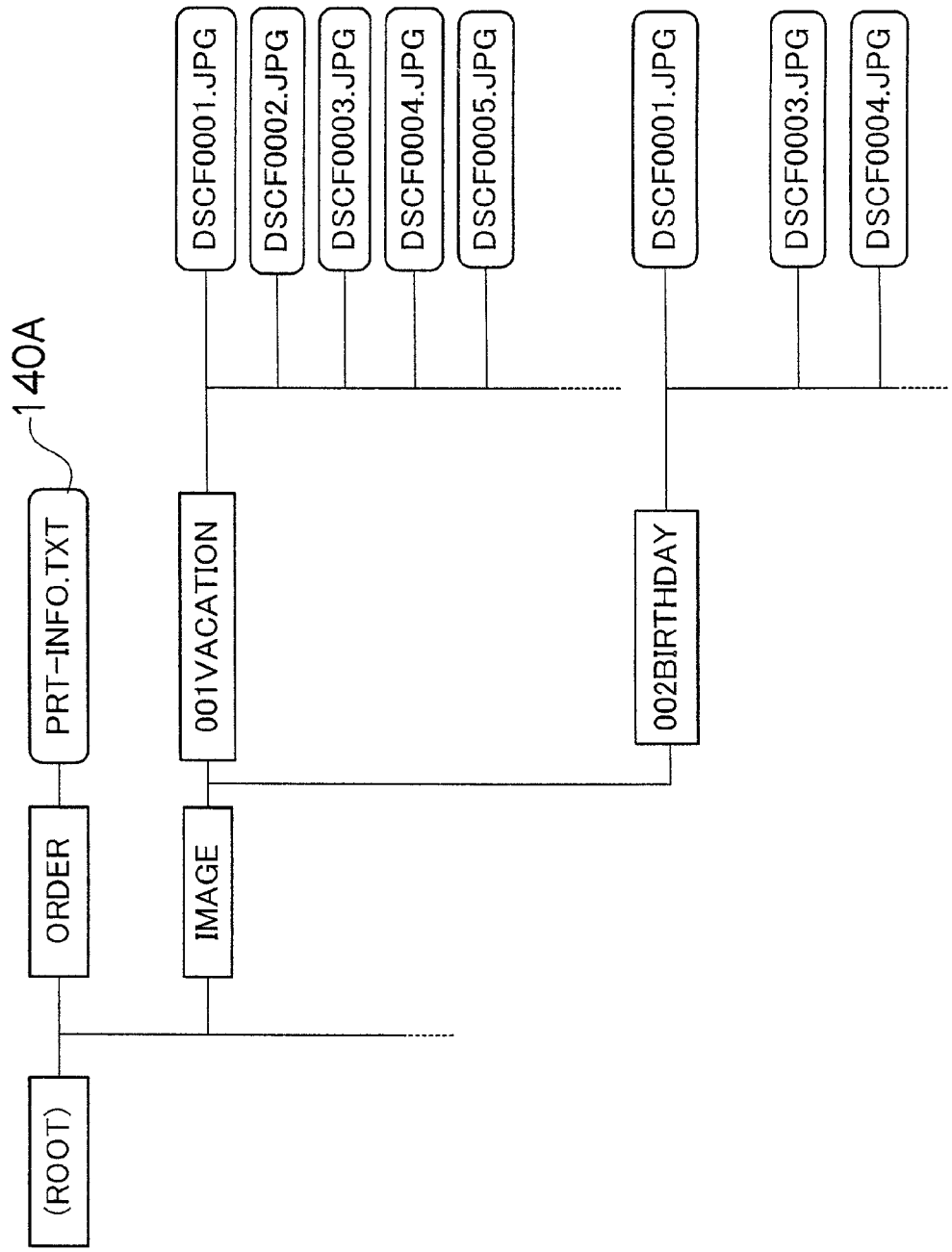
FIG. 6 shows the structure of directories including image files stored in a storage medium of the electronic camera.

FIG. 6 shows the structure of the directories including the image files stored in the storage medium 36 of the electronic camera 10.

A directory "ROOT" is composed of a directory "ORDER" that has the print file "PRT-INFO.TXT" 140A and a directory "IMAGE" including the image data. The directory "IMAGE" is composed of a directory "001VACATION" including image data captured during vacation and a directory "002BIRTHDAY" including image data captured on a birthday. The directory "001VACATION" has image files "DSCF0001.JPG," "DSCF002.JP G."....

A directory name is represented as "nnnXXX...X," and "nnn" is a directory number from 001 to 999, and "XXX...X" is an alphabetical name. A file name is represented as "DSCFmmmm.JPG," and "DSCF" indicates that the image file is captured by the electronic camera, and "mmmm" is a file number from 0001 to 9999, and "JPG" is the extension for the JPEG format. The same file names can be given to the image files of the directories "001VACATION" and "002BIRTHDAY."

A new file name can be given to a file from the directory number and the file number. For example, a new file name "001-0002" is given to the file "DSCF0002.JPG" of the directory "001VACATION". This makes it possible for all the files to be included in one directory, and the files that are not designated for print may not be shown (as if they did not exist).

This also makes it possible for the image files and the audio files to be included in one directory. This is convenient when the image files and the audio files are transmitted to the printer 40 or the storage medium 36 is removed from the camera 10 and inserted in the printer 40. After the printer 40 receives the print file 140A, the CPU 120 changes the names of the received image files and audio files recorded in the print file 140A to produce a new print file. The image and audio can be reproduced according to the new print file.

The image files "DSCF0001.JPG" and "DSCF0003.JPG" of the directory "001VACATION" have the UXGA resolution (1600×1200 pixels), and the image file "DSCF0002.JPG" has the VGA resolution (640×480 pixels). Like this, the image files with different characteristics can be stored in one directory.

To transmit image data to the printer 40 to print desired images, the user sets the communication mode with the input device 88. After the communication is established, the paths of the files or the names of the directories and the files shown in FIG. 6 are displayed on the display 16 of the electronic camera 10. Then, the user selects the desired images by operating the increment button 28 and the decrement button 30 of the input device 88, and selects a printer as the need arises.

The user can record paths of one or more image files and printing conditions in the print file 140A in advance, and the printer 40 receives the image files from the electronic camera 10. In this case, the user sets the communication mode with the communication mode button 78. The communication is established, and the printer 40 automatically receives the print file 140A from the electronic camera 10, and then receives the image files according to the paths recorded in the print file 140A to print the images.

FIG. 7 shows the print file 140A.

The print file 140A includes general information and information on four print jobs. The general information indicates the date and time when the print file 140A was recorded last and the name of the device (creator) that recorded the print file 140A last. The information on each print job indicates the path of the file, the type (size and quality) of paper sheets and the number of prints.

Information on an index print, trimming, a printing direction, the format of the image file, the camera and color (in case color is changed at the printing), the date, the title, the name and address of the user may be added to the information on the print job.

Figure 8:
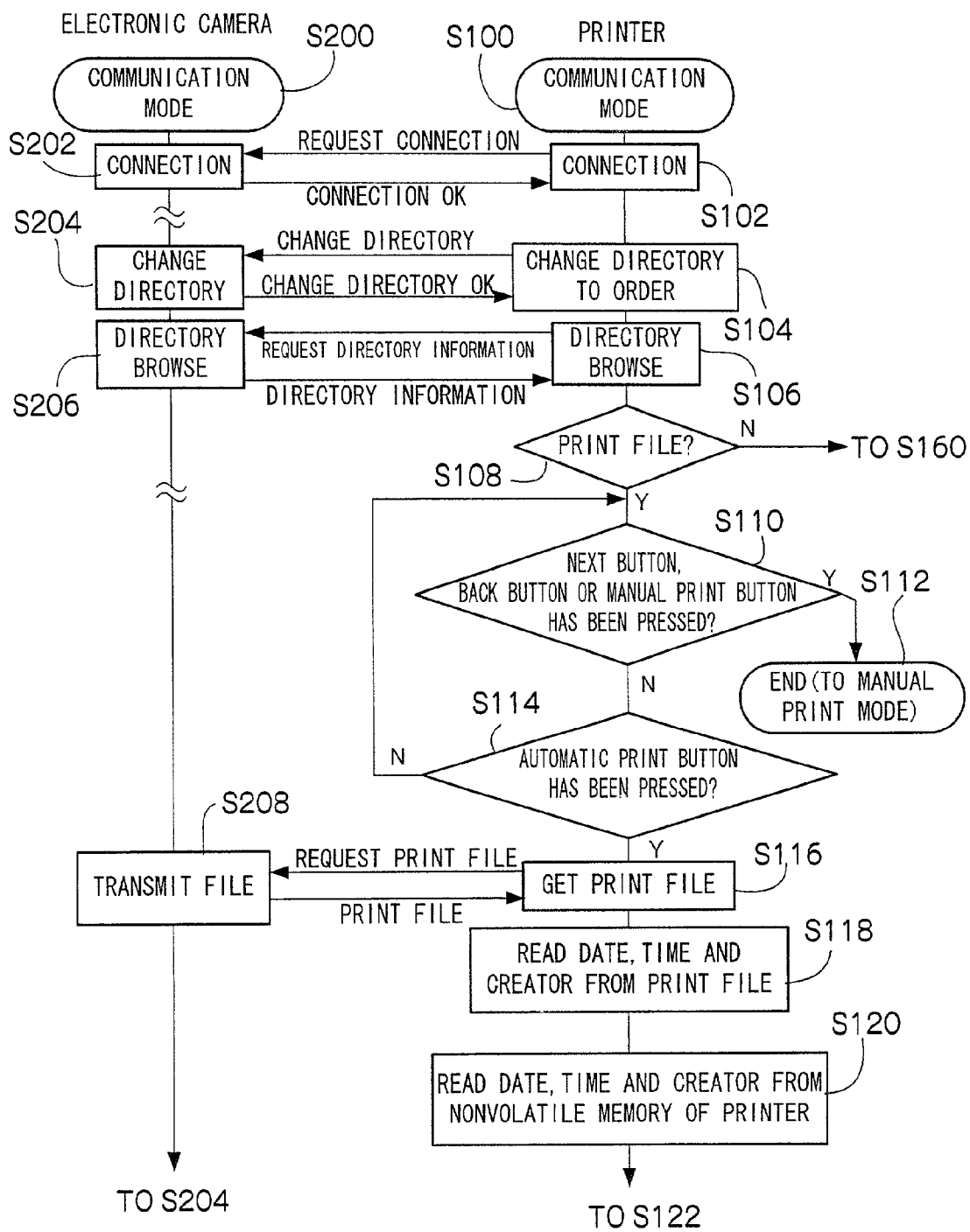
FIG. 8 is a flowchart showing the communication of the electronic camera and the printer.
Figure 8:
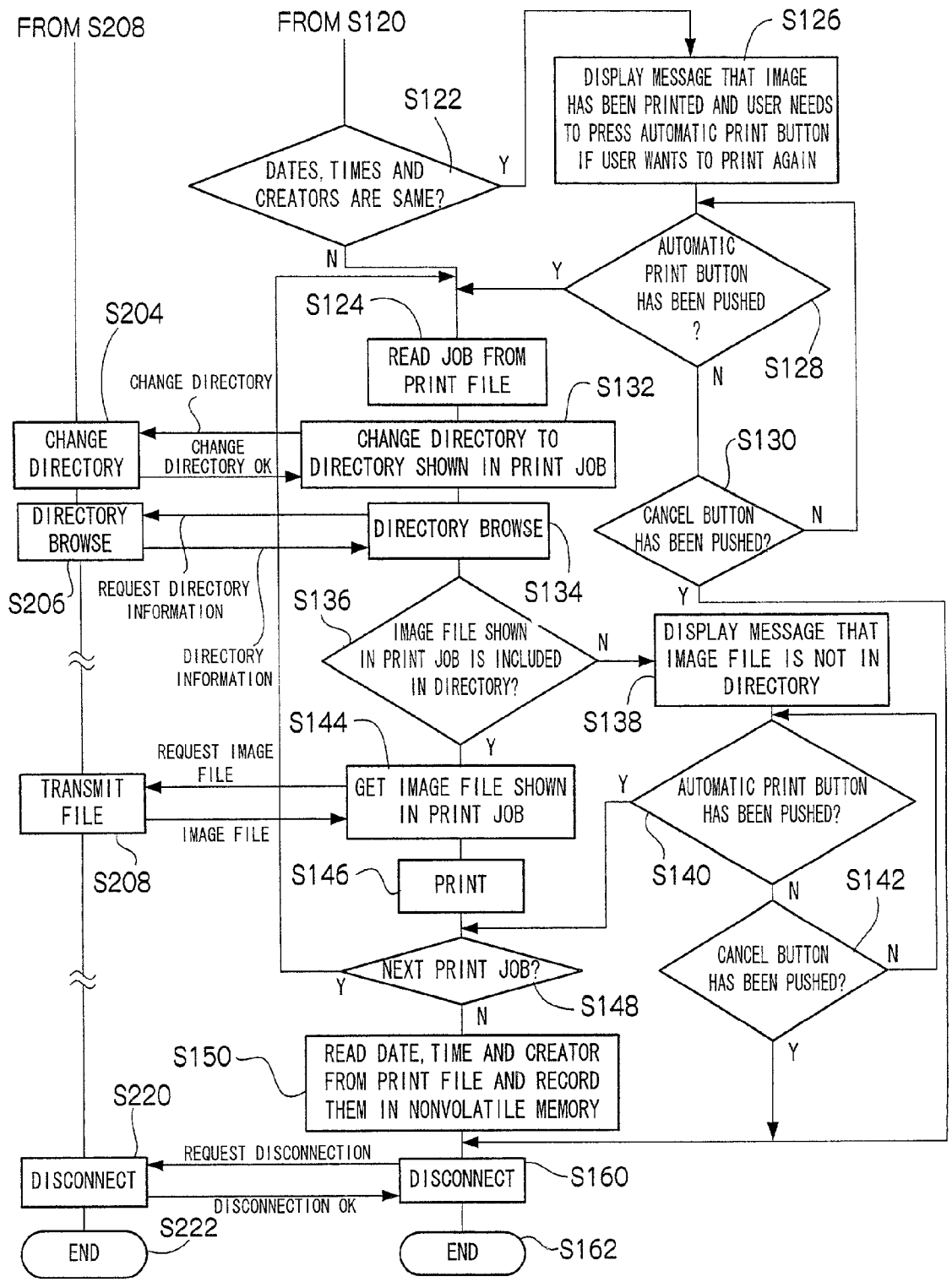

FIG. 8 is a flowchart showing the communication of the electronic camera 10 and the printer 40.

After setting the electronic camera 10 at the communication mode (S200), the user sets the printer 40 at the communication mode (S100). Then, the printer 40 requests the electronic camera 10 to be connected with the printer 40 (S102). In response to the request, the camera 10 is connected with the printer 40 (S202).

After the connection is established, the printer 40 transmits a command to change the current directory to the directory "ORDER" to the camera 10 (S104). On receiving the command, the camera 10 changes the current directory to the directory "ORDER" and informs the printer 40 that the directory has been changed (S204).

After that, the printer 40 requests the directory information from the camera 10 (S106). In response to the request, the camera 10 reads the directory information and transmits it to the printer 40 (S206).

The printer 40 stores the directory information in the memory 122, the nonvolatile memory 124 or the storage medium 46, and then determines whether or not the print file 140A is included in the directory (S108). If no, the printer 40 requests the camera 10 to be disconnected from the printer 40 (S160).

If yes at step 108, the printer 40 determines whether or not any of the buttons of the manual print button 70, the next button 74 and the back button 76 has been pressed (S110). If yes, the printer 40 moves to the manual print mode (S112). If no at step 110, the printer determines whether or not the automatic print button has been pushed (S114). If no, the program returns to step 110.

If yes at step 114, the printer 40 requests the print file 140A from the camera 10 (S116). In response to the request, the camera 10 reads the print file 140A from the storage medium and transmits it to the printer 40 (S208).

After that, the printer 40 reads the date and time and the creator recorded in the print file 140A (S118), and those (in the print file 140 used for printing) recorded in the storage medium of the printer 40 (S120).

Then, the printer 40 determines whether or not the date and time and the creator read from the print file 140A and those read from the nonvolatile memory 124 of the printer 40 are the same (S122). The date and time may be read from time stamp information of the print file 140A, and the read information is not limited to the data and time and the creator. If they are not the same, the printer 40 reads the print job from the print file 140A (S124).

If they are the same at step 122, the printer 40 displays a message that the print files 140A has been used for printing and that the user has to press the automatic print button 66 if the user wants to print the images again (S126). This prevents the images that have been printed from being printed again by mistake.

The printer 40 determines whether or not the automatic print button 66 has been pressed (S128). If yes, the printer 40 erases the message and reads the print job from the print file 140A (S124).

If no at step 128, the printer 40 determines whether or not the cancel button 64 has been pressed (S130). If no, the program for the printer 40 returns to step 128. If yes, the printer erases the message and requests the camera 10 to be disconnected from the printer 40 (S160).

After S124, the printer 40 transmits a command to change the current directory to the directory (including the image file) shown in the print job in the print file 140A to the camera (S132). In response to the command, the camera 10 changes the current directory and informs the printer 40 that the directory has been changed (S204).

Then, the printer 40 requests the directory information from the camera 10 (S134). In response to the request, the camera 10 reads the directory information and transmits it to the printer 40 (S206).

The printer 40 stores the directory information in the memory 122, the nonvolatile memory 124 or the storage medium 46, and then determines whether or not the image file shown in the print job is included in the directory (S136).

If no, the printer 40 displays a message that the image file is not in the directory (S138), and determines whether or not the automatic print button 66 has been pressed (S140). If yes, the printer 40 erases the message and determines whether or not there is the next print job (S148).

If no, the printer 40 determines whether or not the cancel button 64 has been pressed (S142). If no, the program for the printer 40 returns to step 140. If yes, the printer erases the message and requests the camera 10 to be disconnected from the printer 40 (S160).

If the image file is included in the directory 136, the printer 40 requests the file shown in the print job from the camera 10 (S144). In response to the request, the camera 10 transmits the image file to the printer 40 (S208).

On receiving the image file, the printer 40 prints the image in accordance with the print conditions (the number and type of prints) (S146). Then, the printer 40 determines whether or not the print file 140A has the next print job (S148). If yes, the program returns to step 124. If no, the printer 40 reads the date and time and the creator from the print file 140A and records (rewrites) them in the storage medium of the printer 40 (S150).

After that, the printer 40 requests the electronic camera 10 to be disconnected from the printer 40 (S160). In response to the request, the camera 10 is disconnected from the printer 40 (S220) to stop the communication (S222). The printer 40 then stops the communication (S162).

If no at step 108, if yes at step 122 and if no at step 136, the printer 40 may enter the manual print mode.

In the embodiment, the transmitting device is the electronic camera 10 with the storage medium 36, but the present invention is not limited to this. It may be a scanner with an imaging device, a personal computer, or a transmitting device with a storage medium that stores audio data. If the transmitting device transmits audio data, the receiving device may be an audio player that reproduces audio in accordance with reproduction conditions recorded in a reproduction file.

In addition, the receiving device is the printer in the embodiment, but it may be a display that displays the image according to display conditions recorded in a display file.

Figure 9:
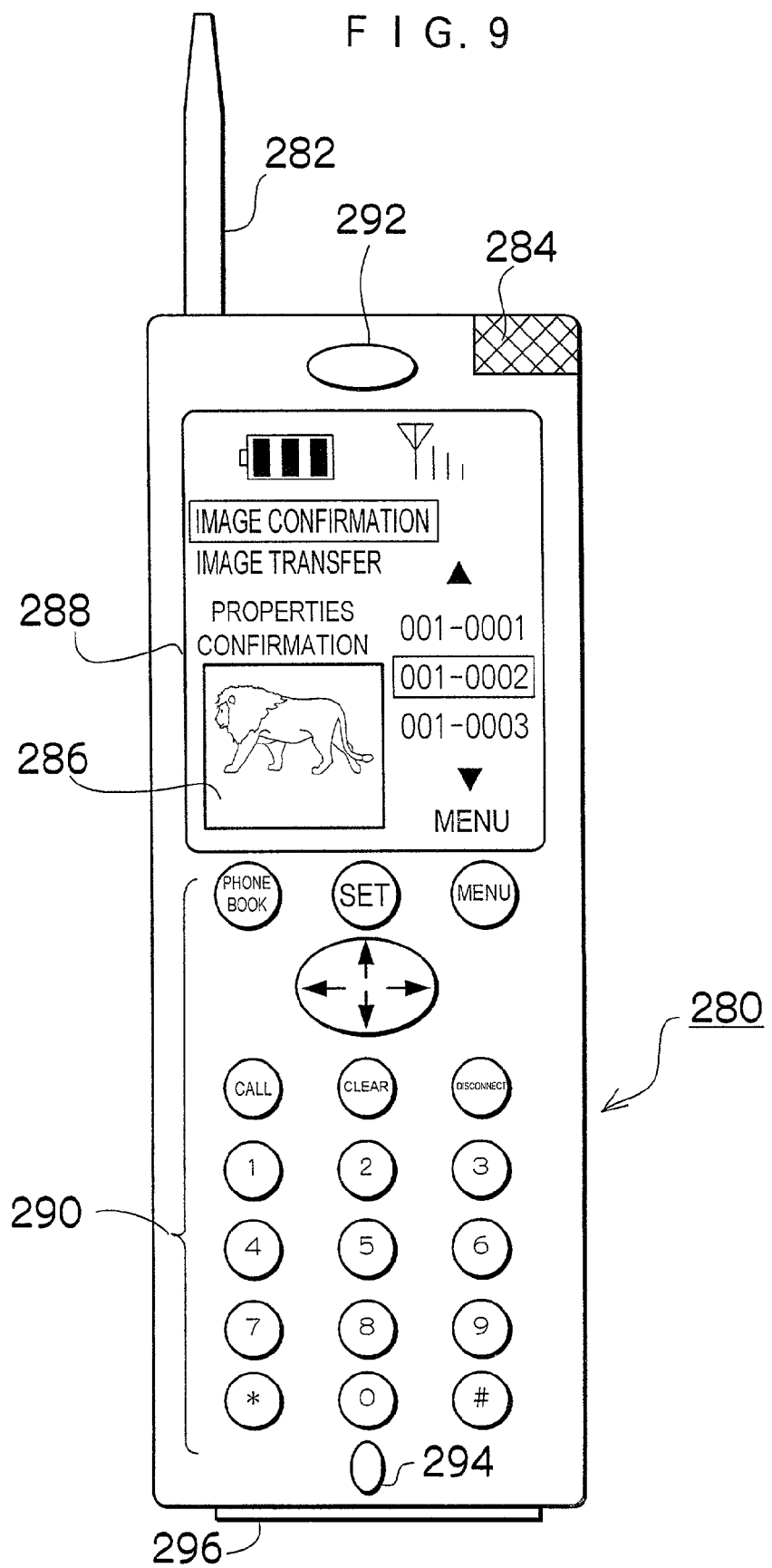
FIG. 9 is an external view of a cellular phone.

FIG. 9 is an external view of a cellular phone (an image data receiving apparatus) 280 that communicates with the electronic camera 10.

The cellular phone 280 comprises an antenna 282 for wireless communication through public lines, a wireless communication device 284 for wireless communication with peripheral communication devices, a display 288 that is a color liquid crystal display or the like that displays communication information and a thumbnail 286, an input device 290 for inputting telephone numbers and addresses of communication devices and selecting data, a receiver 292, a transmitter 294, and a communication connector 296 for wire communication with the peripheral communication devices.

On a menu screen of the display 288, the remaining amount of a battery and an intensity of radio waves are displayed. Modes (an image confirmation mode, an image transfer mode and a properties confirmation mode) and names of image files are also displayed on the menu screen. The user can scroll the file names with up/down keys of the input device 290. The use selects a mode and a file name with cross keys and so on of the input device 290.

Figure 10:
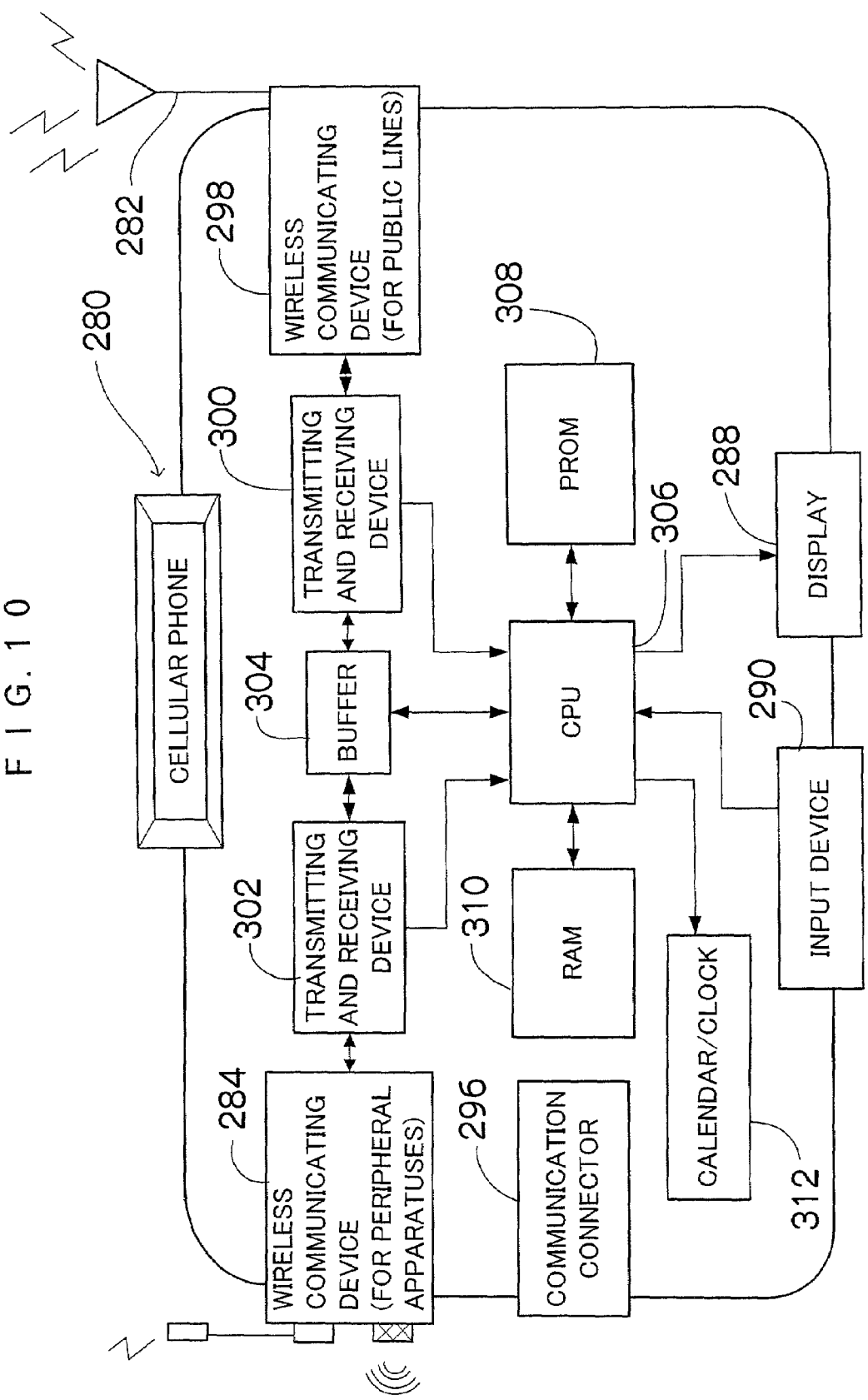
FIG. 10 is a block diagram of the cellular phone.

FIG. 10 is a block diagram of the cellular phone 280.

The cellular phone 280 comprises a wireless communication device 298 for wireless communication through the public lines, a transmitting and receiving device 300 for wireless communication through the public lines, the wireless communication device 284 for wireless communication with the communication devices, the communication connector 296 for wire communication, a transmitting and receiving device 302 for communication with the communication devices, and a buffer 104 that temporarily stores data.

The cellular phone 280 is also provided with a CPU 106 that controls the entire phone 280, a PROM 308 in which a program, constants, telephone numbers, addresses of the communication devices and so on are recorded, a RAM 310 in which CPU 306 operates, and a calendar/clock 312 that keeps the date and time.

The CPU 306 is connected with the display 288, the input device 290 and so on through bus lines and I/Os, so that the CPU 306 can control them.

The wireless communication device 84 and the electronic camera 10 communicate using lights such as radio waves, ultrasonic waves and infrared rays. In the case of the radio waves, a wireless local area network (LAN) may be formed. In the case of the infrared rays, an IrDA format may be used.

In case of the wire communication, a serial interface in a format such as the RS-232, the RS-422 and the USB may be used, and a parallel interface may be used.

Figure 11:
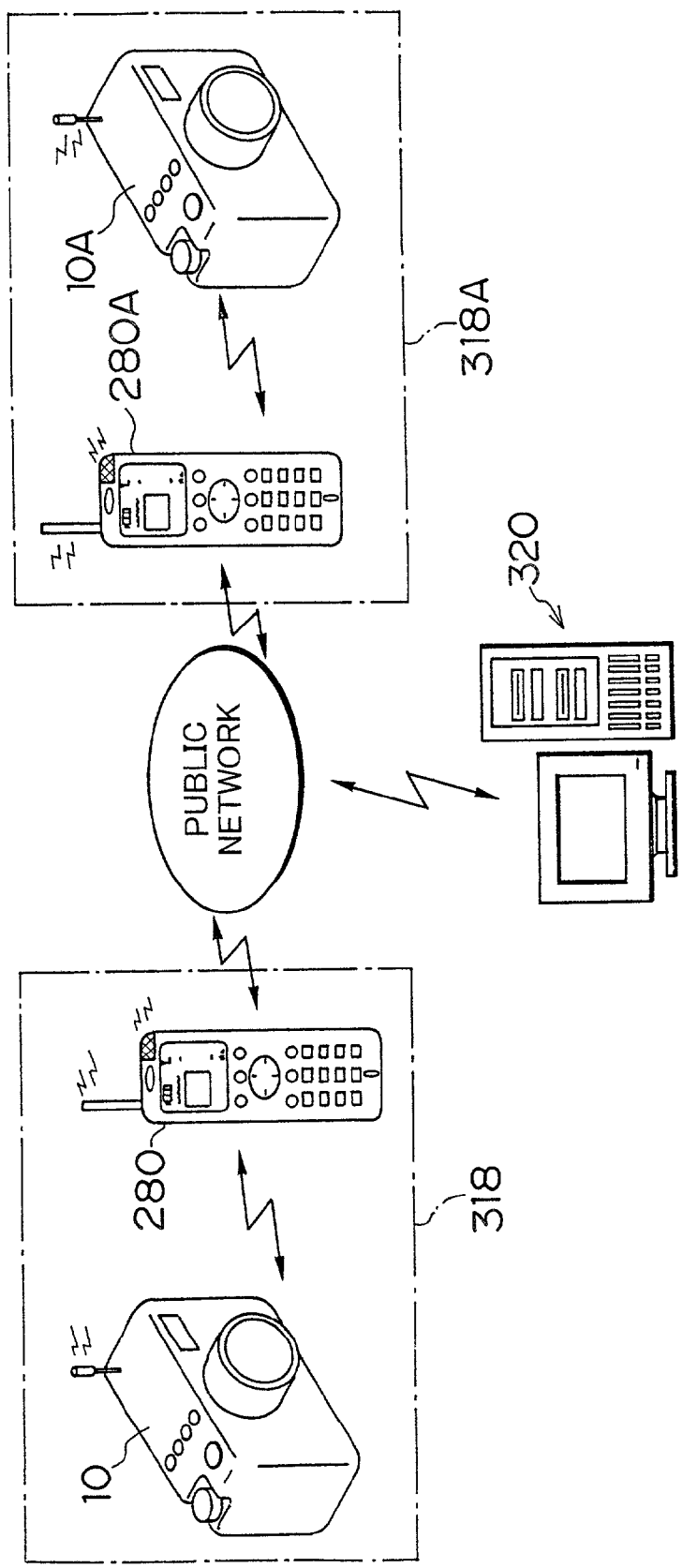
FIG. 11 shows a structure of image data obtaining systems.

FIG. 11 shows structure of image data obtaining systems.

The image data obtaining system 318 is composed of the electronic camera 10 and the cellular phone 280, and the image data obtaining system 318A is composed of an electronic camera 10A and a cellular phone 280A. The user selects an image stored in the electronic camera 10 or 10A by operating the cellular phone 280 or 280A, and the image data is transmitted from the electronic camera 10 or 10A to the other image data obtaining system, a server 320 or the like. The server 320 may print the image on a sheet of paper and deliver the printed image to the user.

FIG. 12 shows the structure of the directories including the image files stored in the storage medium 36 of the electronic camera 10.

A directory "ROOT" has a directory "IMAGE" including the image data, and the directory "IMAGE" is composed of a directory "001VACATION" including image data captured during vacation and a directory "002BIRTHDAY" including image data captured on a birthday. The directory "001VACATION" has image files "DSCF0001.JPG," "DSCF002.JP G."....

The file name "001-0002" displayed on the display 288 in FIG. 9 indicates that the image file is the file "DSCF0002.JPG" of the directory "001VACATION." The image files "DSCF0001.JPG" and "DSCF0003.JPG" of the directory "001VACATION" have the XGA resolution (1024×768 pixels), and the image file "DSCF0002.JPG" has the VGA resolution (640×480 pixels).

The image file "DSCF0001.JPG" of the directory "002BIRTHDAY" has the XGA resolution, and the other files of the directory have the VGA resolution. Like this, the image files with different characteristics can be stored in one directory.

FIG. 13 shows an internal structure of the image file.

The image file is composed of tag information (properties), thumbnail data that is reduced image data and main image data. The tag information includes the shooting date and time, a recording mode, a title, white balance information, focus information, a shooting location, and whether or not the electronic flash was used.

The thumbnail data has about 160×120 pixels, and the main image data has the VGA or XGA resolution. Two pieces of thumbnail data with different resolutions may be stored.

FIG. 14 shows an image file list that the CPU 82 produces and stores in the storage medium 36.

The image file list shows the number (100) of image files stored in the storage medium 36, image file numbers (0001, 0002, . . . ) given to the image files when the image file list is produced, paths of the image files, the number of horizontal pixels, the number of vertical pixels, the recording mode, the date and time of the recording. Information such as the sizes of the image files may be added to the image file list.

Figure 15:
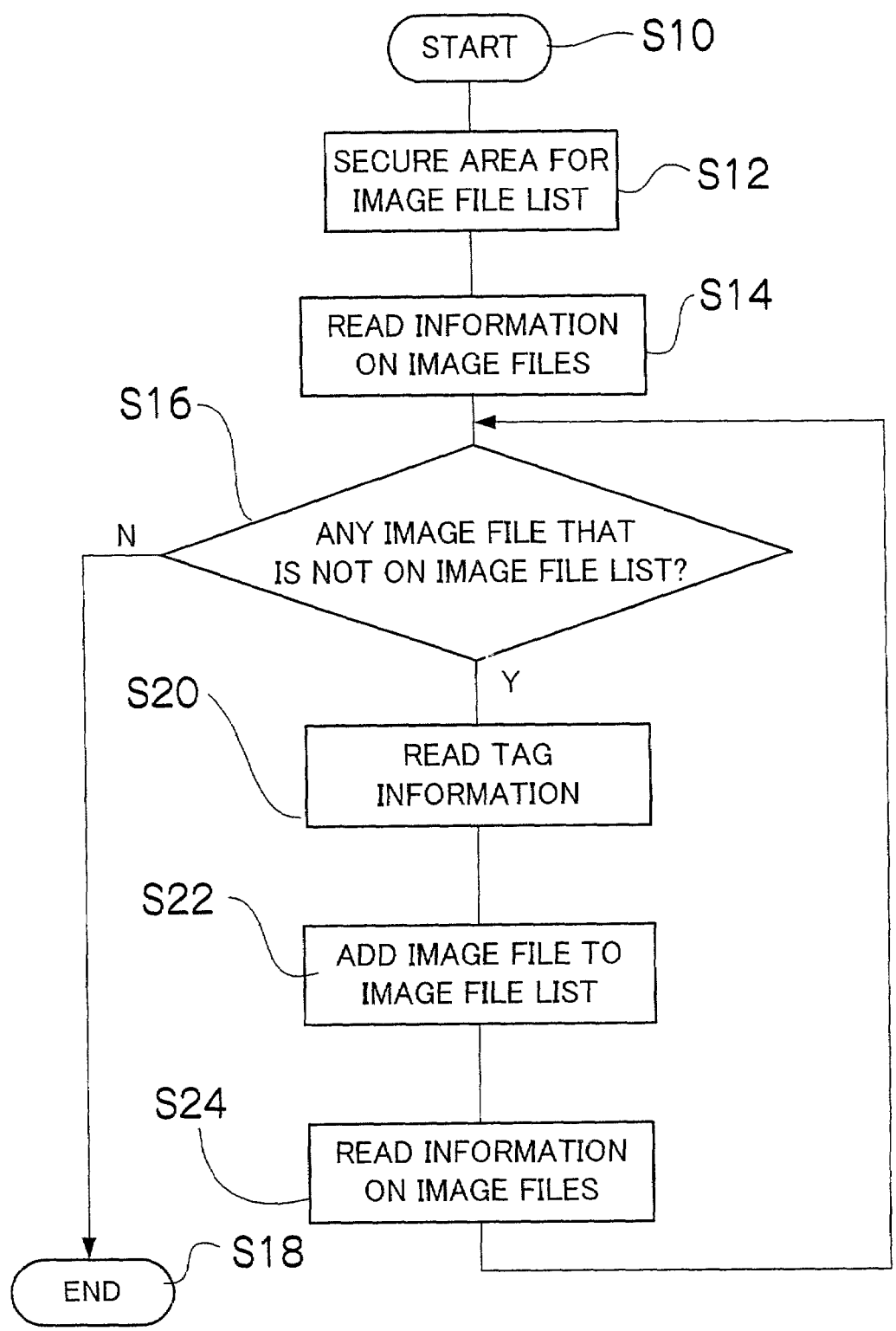
FIG. 15 is a flowchart showing a method in which the electronic camera produces the image file list.

FIG. 15 is a flowchart showing the method in which the electronic camera 10 produces the image file list.

If image files have been added to or erased from the storage medium 36, if the image file list can not be read for some reason, if the user instructs the camera 10 to produce the image file list, if the mode has been switched, if the storage medium 36 has been inserted, if the communication has been established, or if a predetermined time has passed since the last production; the program for the CPU 82 starts the processing (S10).

Then, an area for the image file list is secured in a predetermined directory of the storage medium 36 (S12). If a previous image file list is in the directory, the previous image file list is opened. Then, the information on the image files stored in the storage medium 36 is read (S14).

Next, it is determined whether or not there is any image file that is not on the image file list (S16). If no (all the image files are on the image file list), the program ends the processing (S18). If yes at step 16, the tag information of the image file that is not on the image file list is read (S20). Then, the image file is added to the image file list (S22). Next, the information on the image files stored in the storage medium 36 is read (S24), and the program goes to step 16.

If an image file on the image file list has been erased, the image file is deleted from the image file list.

Figure 16:
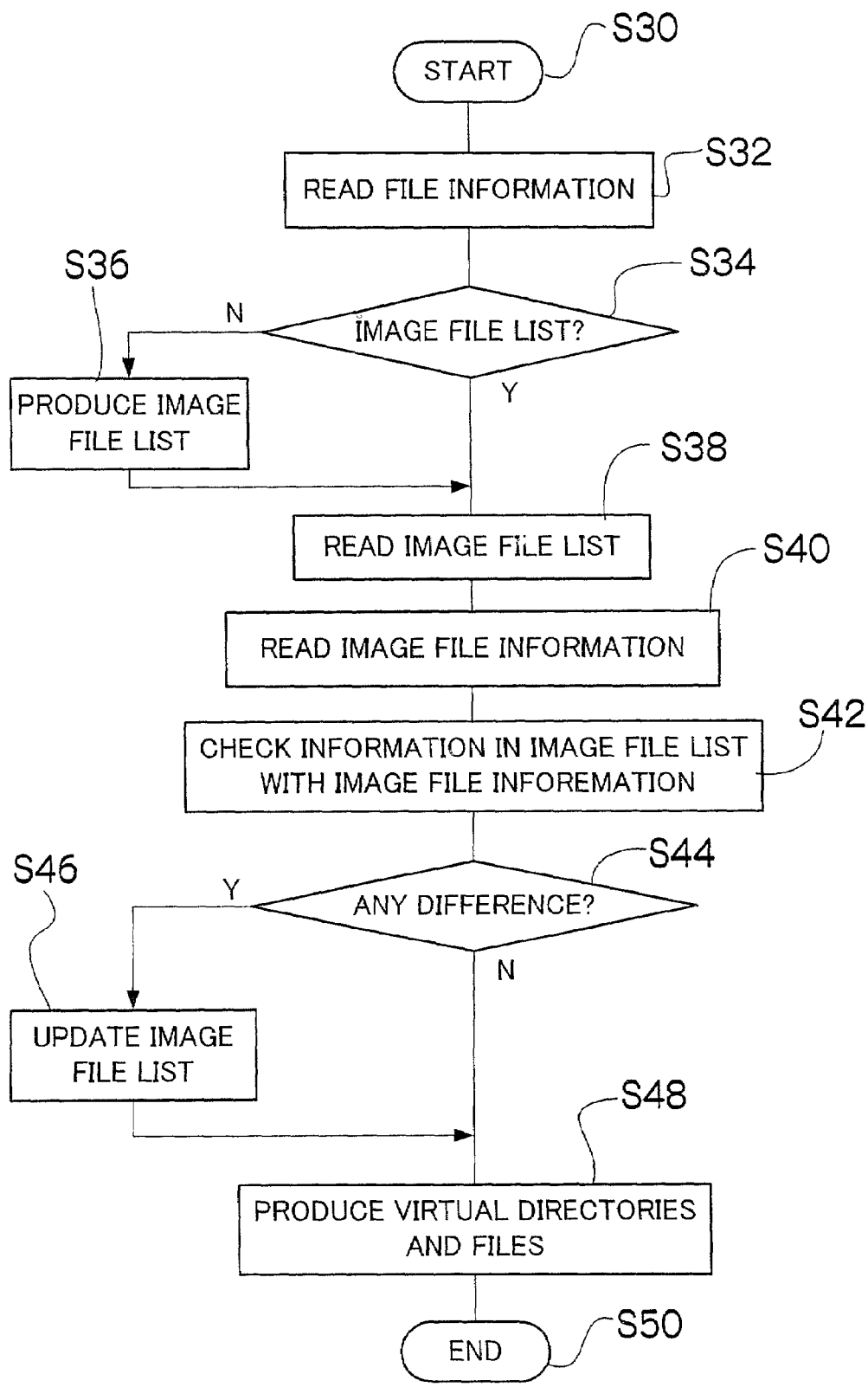
FIG. 16 is a flowchart showing the procedure of reading and producing the image file list.

FIG. 16 is a flowchart showing the procedure of reading and producing the image file list.

When the electronic camera 10 receives an inquiry about the directory structure of the image data, the program for the CPU 82 starts the processing (S30).

Then, the file information of the storage medium 36 is read (S32), and it is determined whether or not there is the image file list (S34). If no, the image file list is produced as shown in the flowchart in FIG. 14 (S36). After step 36 or if yes at step 34, the image file list is read (S38), and the image file information of the storage medium 36 is read (S40). Since the information in the image files is not read, information on even thousands of image files can be read quickly.

Then, the information in the image file list read at step 38 is checked with the image file information read at step 40 (S42), and it is determined whether or not there is any difference between them (S44). If yes, the image file list is updated according to the image file information read at step 40 (S46).

After step 46 or if no at step 44, virtual directories and files (see FIG. 17) are produced according to the updated file list (S48), and the processing is finished (S50).

FIG. 17 shows the structure of the virtual directories and files categorized according to resolutions.

A directory "ROOT" is composed of a virtual directory "QQVGA" storing virtual image files with the QQVGA resolution, a virtual directory "QVGA" storing virtual image files with the QVGA resolution, a virtual directory "VGA" storing virtual image files with the VGA resolution, a virtual directory "SVGA" storing virtual image files with the SVGA resolution, a virtual directory "XGA" storing virtual image files with the XGA resolution, and a virtual directory "Properties" storing text files concerning the tag information.

Each directory has directories "001VACATION" and "002BIRTHDAY." Each of the directories "001VACATION" and "002BIRTHDAY" has virtual image files "DSCF0001.JPG," "DSCF0002.JFPG," "DSCF0003.JPG,"... produced from the original image files. These virtual directories and virtual files do not exist in reality, but they may be actually stored if the processing speed of the CPU 82 is high enough and the storage medium 36 has enough capacity.

As shown in FIG. 17, the directory "001VACATION" of the virtual directory "SVGA" does not have the virtual file "DSCF0002.JPG" since the original image file has the VGA resolution that is lower than the SVGA resolution as shown in FIGS. 12 and 14. Likewise, the directory "XGA" does not have virtual files of the images recorded with the VGA resolution.

FIG. 18 shows a description of the paths of the virtual files shown in FIG. 17.

Marks "¥" represent pauses of the paths, and marks "/" may be used instead of the marks "¥".

Figure 19:
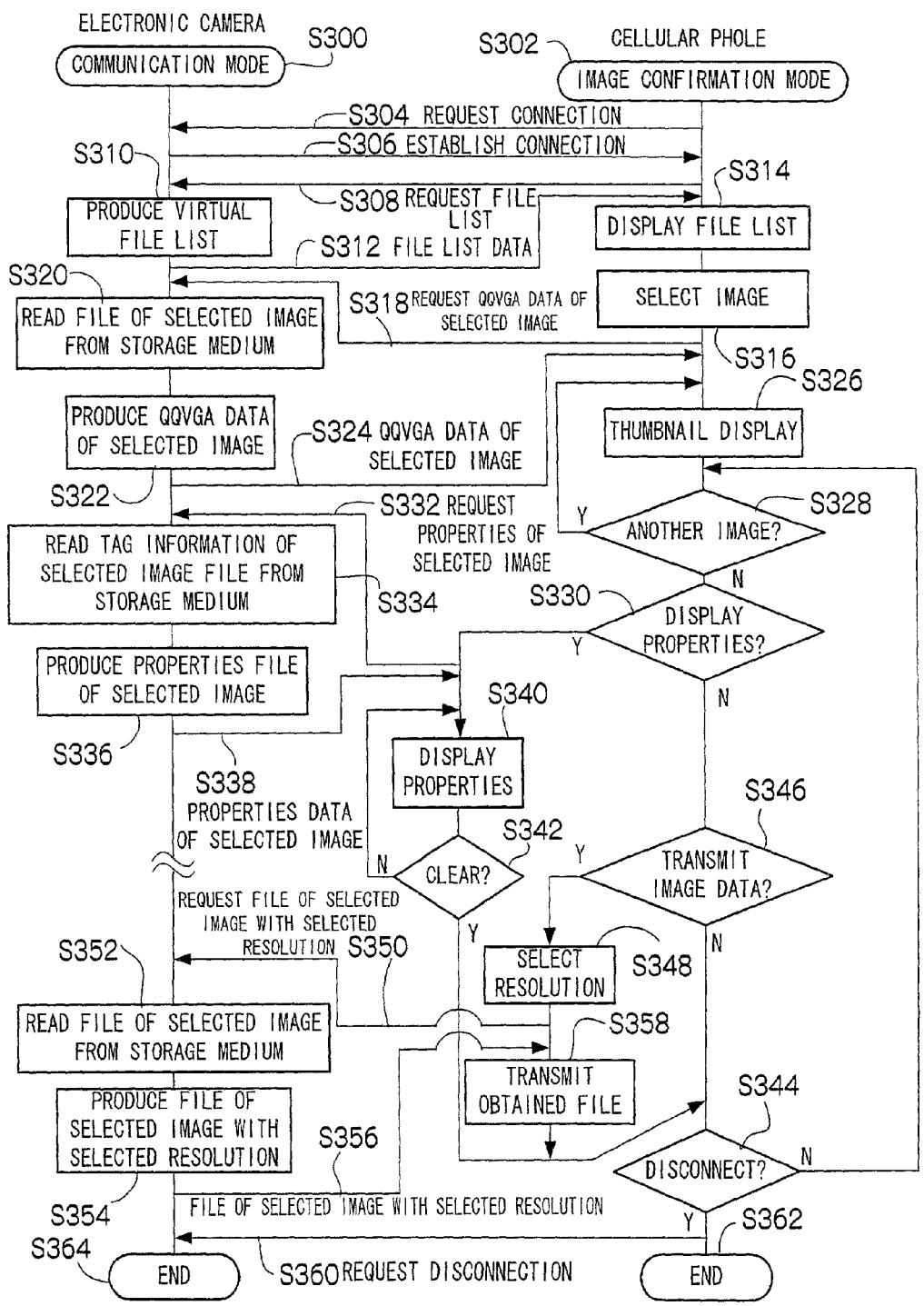
FIG. 19 shows the procedure in which the cellular phone obtains image data stored in the electronic camera.

FIG. 19 shows the procedure in which the cellular phone 280 obtains image data stored in the electronic camera 10.

After the electronic camera 10 is set at the communication mode (S300) and the cellular phone 280 is set at the image confirmation mode (S302), the cellular phone 280 requests the camera 10 to be connected with the cellular phone 280 (S304). In response to the request, the electronic camera 10 establishes the connection (S306).

After that, the cellular phone 280 requests the file list from the electronic camera 10 (S308).

In response to the request, the electronic camera 10 produces the virtual file list shown in FIG. 18 according to the image file list recorded in the storage medium 36 (S310), and transmits the file list data to the cellular phone 280 (S312).

The cellular phone 280 displays the file list on the display 288 (S314).

The user selects the image transfer mode and an image file (for example, the image file "001-0002") (S316). Then, the cellular phone 280 requests the QQVGA data of the selected image (S318).

The electronic camera 10 reads the image file from the storage medium 36 (S320), and produces the QQVGA image data from the image file (S322). If the thumbnail data of the original image file stored in the storage medium 36 has the QQVGA resolution, the electronic camera 10 reads the thumbnail data.

The electronic camera 10 transmits the QQVGA image data to the cellular phone 280 (S324), and the cellular phone 280 displays the QQVGA image or the thumbnail on the display 288 (S326).

Then, the user determines whether or not the user wants to display another thumbnail (S328). If yes, the program returns to step 126. If no, the user determines whether or not the user wants to display the properties of the image file (S330). If yes, the cellular phone 280 requests the properties of the image file from the electronic camera 10 (S332).

In response to the request, the electronic camera 10 reads the tag information of the image file from the storage medium 36 (S334), and produces the properties File of the image from the tag information (S336).

Figure 20:
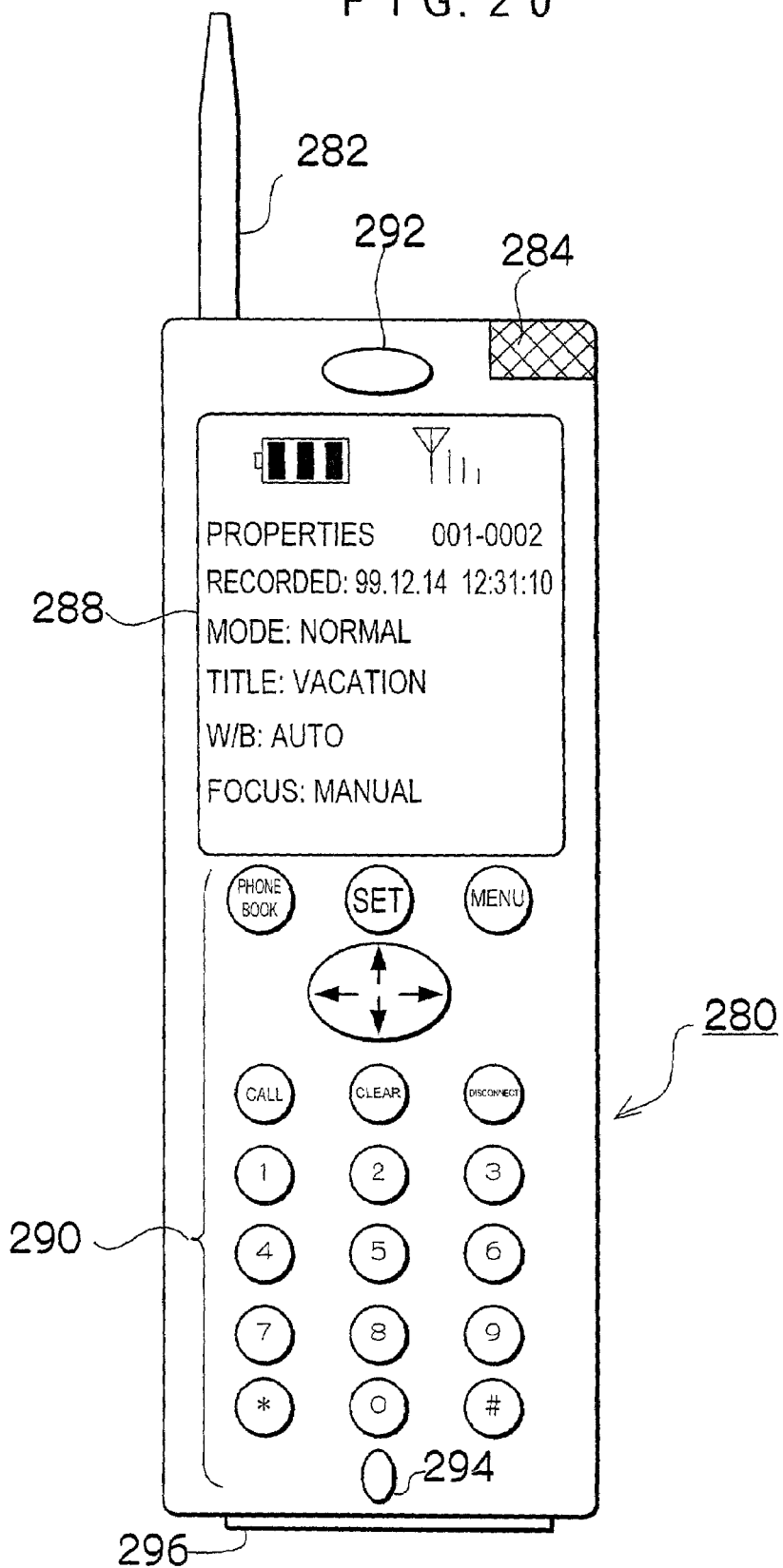
FIG. 20 shows a display of the cellular phone in a properties confirmation mode.

The electronic camera 10 transmits the properties file to the cellular phone 280 (S338), and the cellular phone 280 displays the properties on the display 288 as shown in FIG. 20 (S340).

It is determined whether or not the user has pushed a clear button of the input device 290 (S342). If no, the program returns to step 340.

If no at step 330, the user determines whether or not the user wants to transmit the image data to the server 320 or the like (S346). If yes, the user selects a resolution looking at a resolution selection screen displayed on the display 288 as shown in FIG. 21 (S348).

After the user selects the resolution (for example, the VGA), the cellular phone 280 requests the image file with the selected resolution from the camera 10 (S350).

In response to the request, the electronic camera 10 reads the image file from the storage medium 36 (S352), and produces the image data with the selected resolution (S354). The image data may be stored in the storage medium 36, the frame memory 110, the memory 96 or the nonvolatile memory 97.

Then, the camera 10 transmits the produced image data to the cellular phone 280 (S356), and the cellular phone 280 transmits it to the server 320, a printer or the like (S358).

After step 358, if yes at step 342 or if no at step 346, the cellular phone 280 determines whether or not the user has pushed a disconnect button (S344). If no, the program returns to step 328. If yes, the cellular phone 280 requests the camera 10 to be disconnected from the cellular phone 280(S360), and finishes the processing (S362). In response to the request, the camera 10 finishes the processing (S364).

If the user wants to display an image on the display 288 of the cellular phone 280 in the image confirmation mode as shown in FIG. 22, the cellular phone 280 requests image data with the resolution (for example, the QVGA (320×240 pixels)) for the display 288 from the camera 10.

In the electronic camera 10, image data is read from the storage medium and is directed to decompression processing, and processing to produce image data of the "QVGA" size is performed. The QVGA image data of the current frame obtained in this way is transmitted to the communication device 80, and the QVGA image of the current frame number is displayed on the display 88.

FIG. 23 shows another structure of the directories including the image files stored in the storage medium 36 of the electronic camera 10.

A directory "ROOT" has a directory "IMAGE" including the image data, and the directory "IMAGE" is composed of a directory "001VACATION" including image data captured during vacation and a directory "002BIRTHDAY" including image data captured on a birthday. The directory "001VACATION" has image files "DSCF0001.JPG," "DSCF0002.JPG". . . .

In the directory "001VACATION," the recording modes of the image files "DSCF0001.JPG," "DSCF0002.JPG" and "DSCF0003.JPG" are the "Economy" (the high compression rate), the "Normal" (the medium compression rate) and the "Fine" (the low compression rate), respectively. In the directory "002BIRTHDAY," the recording modes of the image files "DSCF0001.JPG," "DSCF0003.JPG" and "DSCF0004.JPG" are the "Fine," "Normal" and "Economy," respectively.

FIG. 24 shows the structure of the virtual directories and files categorized according to recording modes.

A directory "ROOT" is composed of a virtual directory "Economy" storing virtual image files with the high compression rate, a virtual directory "Normal" storing virtual image files with the medium compression rate, a virtual directory "Fine" storing virtual image files with the low compression mode.

Each directory has directories "001VACATION" and "002BIRTHDAY." Each of the directories "001VACATION" and "002BIRTHDAY" has virtual image files "DSCF0001.JPG," "DSCF0002.JPG," "DSCF0003.JPG,". . . produced from the original image files. These virtual directories and virtual files do not exist in reality, but they may be actually stored if the processing speed of the CPU 82 is high enough and the storage medium 36 has enough capacity.

As shown in FIG. 24, the directory "001VACATION" of the virtual directory "Normal" does not have the virtual file "DSCF0001.JPG" since the recording mode of the original image file is the "Economy" as shown in FIG. 23. Likewise, the directory "Fine" does not have virtual files of the images recorded in the "Normal" mode.

Figure 25:
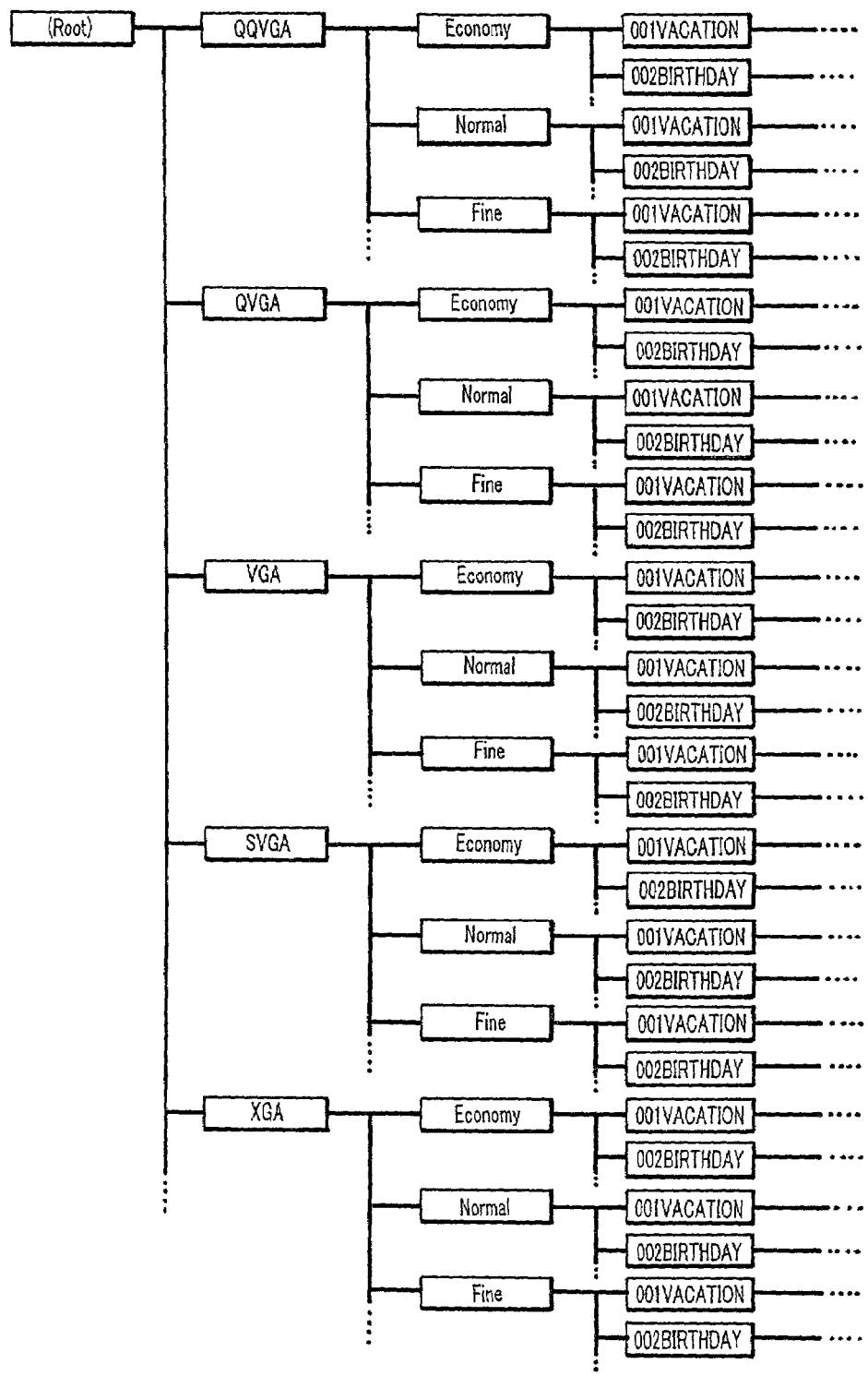
FIG. 25 shows the structure of the virtual directories and files categorized according to resolutions and recording modes.

FIG. 25 shows the structure of the virtual directories and files categorized according to resolutions and recording modes.

A directory "ROOT" is composed of virtual directories "QQVGA", "QVGA". . . , and each directory has virtual directories "Economy," "Normal" and "Fine." Each of the virtual lo directories "Economy," "Normal" and "Fine" has directories "001VACATION" and "002BIRTHDAY." Each of the directories "001VACATION" and "002BIRTHDAY" has virtual image files "DSCF0001.JPC," "DSCF0002.JPG," "DSCF0003.JPG,". . . produced from the original image files. These virtual directories and virtual files do not exist in reality, but they may be actually stored if the processing speed of the CPU 82 is high enough and the 15 storage medium 36 has enough capacity.

As described above, according to the image data communication method of the present invention, the data transmitting device transmits the print file showing the file names of the image files and the print conditions to the data receiving device; and the data receiving device stores the received print file in the storage medium; and the data receiving device requests the one of the image files from the data transmitting according to the file names shown in the print file; and the data transmitting device transmits the one of the image files to the data receiving device in response to the request; and the data receiving device stores the one of the image files in the storage medium and prints the image in the print condition shown in the print file; and the data receiving device and the data transmitting device repeat the steps for each of the image files. Thus, the data receiving device can easily receive image data from the data transmitting device and print the image.

Also, according to the image data communication method of the present invention, the data transmitting device produces the image file list showing the properties of the image files and stores the image file list in the storage medium; and the data transmitting device produces the requested image file information according to the image file list and transmits it to the data receiving device when the user requests the image file information from the data transmitting device by operating the data receiving device; and the data receiving device displays the received image file information; the user selects the image file according to the displayed image file information by operating the data receiving device, and the data receiving device requests the selected image file from the data transmitting device; and the data transmitting device transmits the requested image file to the data receiving device; and the data receiving device stores the received image file in a storage medium. Thus, the image file information can be quickly produced even if many image files are stored.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image data communication method in which a data transmitting device transmits one of image files of image data stored in a data transmitting device storage medium to a data receiving device, wherein:

the data transmitting device produces an image file list showing properties of the image files and print conditions and stores the image file list in the storage medium of the data transmitting device, wherein the image file list is produced in an off-line state;

when a user requests image file information from the data transmitting device by operating the data receiving device, the data transmitting device produces the requested image file information according to the image file list and transmits it to the data receiving device;

the data receiving device displays the received image file information;

the user selects the image file according to the displayed image file information by operating the data receiving device, and the data receiving device requests the selected image file from the data transmitting device;

the data transmitting device transmits the requested image file to the data receiving device; and the data receiving device stores the received image file in a data receiving device storage medium, wherein the data transmitting device is an image capturing device.

2. The image data communication method as defined in claim 1, wherein:

the data transmitting device checks the image file list with the image files; and if the image file list does not reflect a latest change of the image files, the data transmitting device updates the image file list.

3. The image data communication method as defined in claim 1, wherein the image file information is a structure of directories including the image files.

4. The image data communication method as defined in claim 1, wherein the properties of the image files are resolutions.

5. The image data communication method as defined in claim 4, wherein image flies with the same resolution are included in one directory.

6. The image data communication method as defined in claim 1, wherein the properties of the image files are compression rates.

7. The image data communication method as defined in claim 6, wherein image files with the same compression rate are included in one directory.

8. A printing apparatus for receiving image data for printing, comprising:

a transmitter for transmitting a first request to an image capturing device for a print file wherein the print file includes file names of image files and print conditions;

a receiver for receiving the print file in response to the transmitted first request for the print file, wherein the transmitter further transmits a second request to the image capturing device for image data corresponding to at least one image file included in the transmitted print file, wherein the receiver further receives the image data from the image capturing device corresponding to the at least one image file in response to the transmitted second request for image data; and a printing module for printing the received image data.

9. The apparatus of claim 8, wherein after establishing a connection with the image capturing device, accessing a directory of files at the image capturing device upon transmitting a third request to the image capturing device.

10. The apparatus of claim 8, further comprising:

a comparator module for comparing stored creation information associated with the image data with creation information accessed at the image capturing device, wherein the image data is received from the image capturing device upon determining that the image data has not been previously printed based on the compared creation information.

\* \* \* \* \*